(12) United States Patent
Bruns et al.

(10) Patent No.: US 11,483,580 B2
(45) Date of Patent: Oct. 25, 2022

(54) DISTRIBUTED ARCHITECTURE FOR ENCODING AND DELIVERING VIDEO CONTENT

(71) Applicant: COHERENT LOGIX, INCORPORATED, Austin, TX (US)

(72) Inventors: Michael W. Bruns, Portland, OR (US); Michael B. Solka, Austin, TX (US); Carl S. Dobbs, Austin, TX (US); Martin A. Hunt, Austin, TX (US); Michael B. Doerr, Dripping Springs, TX (US); Tommy K. Eng, Pleasanton, CA (US)

(73) Assignee: Coherent Logix, Incorporated, Austin, TX (US)

( * ) Notice: Subject to any disclaimer, the term of this patent is extended or adjusted under 35 U.S.C. 154(b) by 1228 days.

(21) Appl. No.: 13/915,499

(22) Filed: Jun. 11, 2013

(65) Prior Publication Data

US 2013/0343450 A1    Dec. 26, 2013

Related U.S. Application Data

(60) Provisional application No. 61/658,761, filed on Jun. 12, 2012.

(51) Int. Cl.
*H04N 19/147* (2014.01)
*H04N 19/40* (2014.01)
(Continued)

(52) U.S. Cl.
CPC ......... *H04N 19/40* (2014.11); *H04N 21/2343* (2013.01); *H04N 21/2353* (2013.01);
(Continued)

(58) Field of Classification Search
USPC ..................................... 375/240.02
See application file for complete search history.

(56) References Cited

U.S. PATENT DOCUMENTS 6,407,680 B1    6/2002  Lai et al.
6,542,546 B1 *  4/2003  Vetro ...................... H04L 29/06
                                                                                375/240.12
(Continued)

FOREIGN PATENT DOCUMENTS

CN          1816151 A        8/2006
CN        101098483 A        1/2008
(Continued)

OTHER PUBLICATIONS

Liang-Jin Lin, "Bit-Rate Control Using Piecewise Approximated Rate-Distortion Characteristics", Aug. 1998, IEEE Transactions on Circuits and Systems for Video Technology, vol. 8, No. 4, pp. 446-459.*

(Continued)

*Primary Examiner* — Patrick E Demosky
(74) *Attorney, Agent, or Firm* — Kowert, Hood, Munyon, Rankin & Goetzel, P.C.

(57) ABSTRACT

A split architecture for encoding a video stream. A source encoder may encode a video content stream to obtain an encoded bitstream and a side information stream. The side information stream includes information characterizing rate and/or distortion estimation functions per block of the video content stream. Also, a different set of estimation functions may be included per coding mode. The encoded bitstream and side information stream may be received by a video transcoder, which transcodes the encoded bitstream to a client-requested picture resolution, according to a client-requested video format and bit rate. The side information stream allows the transcoder to efficiently and compactly perform rate control for its output bitstream, which is (Continued)

transmitted to the client device. This split architecture may be especially useful to operators of content delivery networks.

59 Claims, 17 Drawing Sheets

(51) Int. Cl.
    *H04N 21/258*     (2011.01)
    *H04N 21/235*     (2011.01)
    *H04N 21/2343*     (2011.01)
    *H04N 21/2662*     (2011.01)

(52) U.S. Cl.
    CPC . *H04N 21/25808* (2013.01); *H04N 21/25825* (2013.01); *H04N 21/2662* (2013.01)

(56) References Cited

U.S. PATENT DOCUMENTS

| | | | |
|---|---|---|---|
| 8,751,677 B2 | 6/2014 | Li et al. | |
| 8,761,248 B2 | 6/2014 | Li et al. | |
| 8,798,137 B2* | 8/2014 | Po | H04N 19/176 375/240.02 |
| 2004/0156438 A1 | 8/2004 | Choi | |
| 2005/0129123 A1* | 6/2005 | Xu | H04N 19/149 375/240.16 |
| 2005/0182972 A1* | 8/2005 | Apostolopoulos | H04L 9/0643 726/19 |
| 2006/0171456 A1 | 8/2006 | Kwon | |
| 2007/0081587 A1* | 4/2007 | Raveendran | H04N 5/144 375/240.1 |
| 2008/0181298 A1* | 7/2008 | Shi | H04N 21/234327 375/240.03 |
| 2009/0153737 A1* | 6/2009 | Glen | G09G 5/006 348/571 |
| 2010/0017516 A1* | 1/2010 | Sparrell | H04N 21/23106 709/226 |
| 2010/0158126 A1* | 6/2010 | Bai | H04N 21/234309 375/240.16 |
| 2011/0090960 A1* | 4/2011 | Leontaris | H04N 19/103 375/240.12 |
| 2011/0145859 A1* | 6/2011 | Novack | H04N 21/43615 725/38 |
| 2011/0170591 A1* | 7/2011 | Li | H04N 19/105 375/240.01 |
| 2012/0013746 A1* | 1/2012 | Chen | G11B 27/034 348/180 |
| 2012/0047535 A1* | 2/2012 | Bennett | G09G 3/003 725/62 |
| 2012/0106643 A1* | 5/2012 | Fujimoto | H04N 21/234363 375/240.16 |
| 2013/0024901 A1* | 1/2013 | Sharif-Ahmadi | G06F 17/30017 725/114 |
| 2014/0130106 A1* | 5/2014 | Syed | H04N 21/2343 725/68 |

FOREIGN PATENT DOCUMENTS

| | | |
|---|---|---|
| CN | 101198035 A | 6/2008 |
| CN | 102067610 A | 5/2011 |
| EP | 2271098 A1 | 5/2011 |
| FR | 2933837 A1 | 1/2010 |
| GB | 2 333 657 A | 7/1999 |
| GB | 2 387 287 A | 10/2003 |
| WO | WO2008092076 A2 | 7/2008 |

OTHER PUBLICATIONS

Cheung et al., "Low power design of Motion Compensation module for MPEG-4 video transcoder in DCT domain", Aug. 5-8, 2007, Circuits and Systems, 2007. NEWCAS 2007. IEEE Northeast workshop on, pp. 277-280.*
Li et al., "Laplace Distribution Based Langrangian Rate Distortion Optimization for Hybrid Video Coding", Dec. 9, 2008, Circuits and Systems for Video Technology, IEEE Transactions on, vol. 19; Issue: 2, pp. 193-205.*
Li et al., "Laplace Distribution Based Lagrangian Rate Distortion Optimization for Hybrid Video Coding", Dec. 9, 2008, Circuits and Systems for Video Technology, IEEE Transactions on, vol. 19; Issue: 2, pp. 193-205.*
Sullivan et al., "Rate-Distortion Optimization for Video Compression", Nov. 1998, Signal Processing Magazine, IEEE (vol. 15; Issue: 6), pp. 74-90.*
Merritt, L. and Vanam, R.; "Improved Rate Control and Motion Estimation for H.264 Encoder"; Image Processing, 2007. ICIP 2007. IEEE International Conference on (vol. 5); Sep. 16, 2007-Oct. 19, 2007; pp. V-309-V-312; IEEE; San Antonio, TX.
Sullivan, Gary J. and Wiegand, Thomas; "Rate-Distortion Optimization for Video Compression"; IEEE Signal Processing Magazine; Nov. 1998; IEEE; pp. 74-90.
Pellan, B. and Concolato, C.; "Media-Driven Dynamic Scene Adaptation"; Image Analysis for Multimedia Interactive Services, 2007. WIAMIS '07. Eighth International Workshop on; Jun. 6-8, 2007; 4 pages; IEEE.
Lavrentiev, Michael; "Transrating of Coded Video Signals via Optimized Requantization"; Submitted to the Senate of the Technion—Israel Institute of Technology Iyar, 5764 Haifa; Apr. 2004; 144 pages.
Li, Xiang; Oertel, Norbert; Hutter, Andreas; Kaup, André; "Laplace Distribution Based Lagrangian Rate Distortion Optimization for Hybrid Video Coding"; IEEE Transactions on Circuits and Systems for Video Technology; Feb. 2009; pp. 193-205; vol. 19, No. 2; IEEE Press; Piscataway, NJ, USA.
Lim, Keng-Pang; Sullivan, Gary; Wiegand, Thomas; "Text Description of Joint Model Reference Encoding Methods and Decoding Concealment Methods"; Study of ISO/IEC 14496-10 and ISO/IEC 14496-5 / AMD6; Jun. 2007; 57 pages; Geneva, Switzerland.
He, Zhihai; Mitra, Sanjit K.; "A Linear Source Model and a Unified Rate Control Algorithm for DCT Video Coding"; IEEE Transactions on Circuits and Systems for Video Technology; Nov. 2002; pp. 970-982; vol. 12, No. 11, IEEE.
Vetro, Anthony; Christopoulos, Charilaos; Sun, Huifang; "Video Transcoding Architectures and Techniques: An Overview"; IEEE Signal Processing Magazine; Mar. 2003; pp. 18-29.
Choi, Jinho and Park, Daechul; "A Stable Feedback Control of the Buffer State Using the Controlled Lagrange Multiplier Method"; IEEE Transactions on Image Processing; Sep. 1994; pp. 546-558; vol. 3, No. 5.
Chang, Kuei-Chung and Chen, Tien-Fu; "Efficient Segment-Based Video Transcoding Proxy for Mobile Multimedia Services"; Journal of Systems Architecture 53 (2007); Feb. 25, 2007; pp. 833-845.
Communication pursuant to Article 94(3) EPC, Application No. 13 732 021.4-1209, dated Sep. 11, 2018, 10 pages.
Ke-Ying Liao et al; "Rate-Distortion Cost Estimation for H.264/AVC"; IEEE Transactions on Circuits and Systems for Video Technology, Institute of Electrical and Electronics Engineers, US, vol. 20, No. 1; Jan. 1, 2010; pp. 38-49; XP011294539; ISSN: 1051-8215.
Yu-Kuang Tu et al; "Rate-Distortion Modeling for Efficient H.264/AVC Encoding"; IEEE Transactions on Circuits and Systems for Video Technology, Institute of Electrical and Electronics Engineers, US, vol. 16, No. 5; May 1, 2007; pp. 530-543; XP011179791; ISSN: 1051-8215.
Extended European Search Report for European Application No. 20195696.8, dated Dec. 4, 2020, 11 pgs.
Chinese Office Action; Application No. 201911002072.9; dated Aug. 24, 2021; 12 pgs.

* cited by examiner

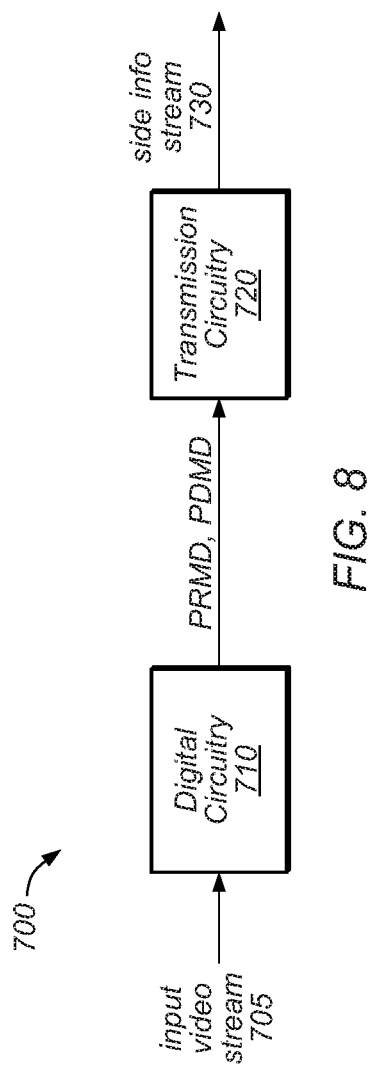

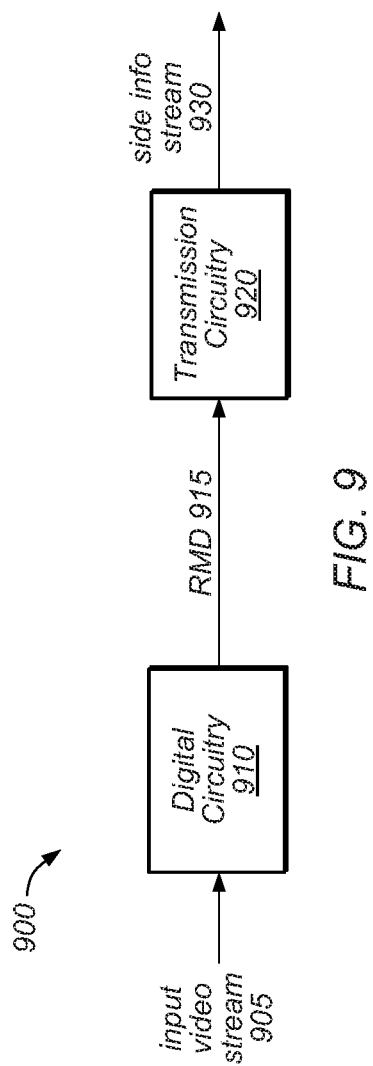

DISTRIBUTED ARCHITECTURE FOR ENCODING AND DELIVERING VIDEO CONTENT

PRIORITY DATA

This application claims benefit of priority to U.S. Provisional Application Ser. No. 61/658,761, titled "Rate Control for Video Compression", filed Jun. 12, 2012, invented by Michael W. Bruns, which is hereby incorporated by reference in its entirety as though fully and completely set forth herein.

FIELD OF THE DISCLOSED EMBODIMENTS

The present invention relates generally to video content compression and distribution, and in particular, to a split architecture for encoding video content and a rate control mechanism to be used in the split architecture.

DESCRIPTION OF THE RELATED ART

The demand for video streaming services is ubiquitous and increasing. Thus, there is an ever-increasing need for methods capable of compressing video content and efficiently delivering the video content to user devices through wired and/or wireless networks.

For example, there is a great demand for the delivery of streaming video service to user devices (e.g., mobile devices) in a wireless network. However, the air interface between the base station (of the wireless network) and the mobile device is vulnerable to radio interference, and the quality of RF propagation changes dynamically due to the movement of objects in the environment, the movement of the mobile device, radio traffic loading and congestion, etc., thus creating varying channel conditions between the basestation and the mobile device. Furthermore, the data in a wireless network is transmitted through RF spectrum, which is limited and expensive. Thus, when the channel condition is poor and when the screen size of the mobile device is less than an HD TV, there is no reason to transmit at a one-size-fits-all bit stream at full resolution and high bit rate when most of the bits will likely be dropped or discarded at the mobile device. There exists a need for a mechanism to deliver streaming video to mobile devices in a manner that adapts to the bandwidth-limited nature of the RF channel and the variability of the channel conditions.

As another example, there exists a need for easing the burdens experienced by media providers and content delivery networks in delivering video content to end users. A content delivery network (CDN) may maintain servers that cache video content titles and deliver the content titles to users upon demand. However, the user devices generally have a wide array of different configurations of video processing capability, e.g., different requirements on picture resolution and video format. Furthermore, the target bit rate for a given user device may change dynamically as channel conditions change. Thus, the CDN has to maintain (or be able to access) a large array of copies of a given content title, i.e., one copy for each possible combination of user device configuration and target bit rate. Consequently, the cost of memory storage becomes a problem for CDN operators. Furthermore, when a user device requests a given content title, and the copy appropriate for the requested configuration and bit rate is not present in the server's cache, the copy must be downloaded from a central repository (e.g., from a media provider such as Netflix or Amazon). Because the number of combinations of content title, user device configuration and bit rate is so large, cache misses occur frequently, and thus, require frequent downloads from the central repositories, e.g., from server farms. Thus, the cost of the download traffic becomes a problem for CDN operators and/or media providers. Therefore, there exists a need for mechanisms capable of delivering video content to users in a cost efficient manner.

Video content is delivered to each user in the form of a compressed bit stream. A video encoder is used to compress the source video stream defining the video content. The video encoder typically needs to apply rate control due to the dynamic complexity of the source video sequence. In other words, the video encoder needs to dynamically control the compression process in order to control the output bit rate of the compressed bit stream. Furthermore, in the context of streaming video services, the rate control needs to be adaptable, to support a target bit rate that changes according to dynamic network conditions between the encoder and the remote decoder. Therefore, there exists a need for video encoders and/or transcoders capable of performing rate control in a computationally efficient manner.

SUMMARY

The systems, methods and architectures disclosed herein may be used in a wide variety of contexts and applications.

In one of the disclosed embodiments, network edge transcoders may be used to encode and stream data to user devices (e.g., mobile devices) in a wireless network. The network edge transcoder may be situated at or near (e.g., coupled to) the base station, and may be configured to transcode a first encoded video stream of high quality and/or high definition to a second encoded video stream that is customized (e.g., in terms of one or more factors such as picture size, video format and bitrate) for a mobile device that is being currently served. Furthermore, the network edge transcoder may be configured to dynamically control the bitrate of the second encoded video stream in response to changes in the condition of the transmission channel, changes in received video quality, and/or configuration changes of the mobile device. These abilities to customize and dynamically control are of great economic benefit in the context of a wireless network. A network architecture that employs such network edge transcoders to customize the user bit streams at "the edge of the network" avoids burdening the server farm in the cloud. The mobile device may periodically send back information (analytics) to the base station so that the network edge transcoder can accordingly optimize the bit stream in real time, to achieve the most optimal use of the limited RF spectrum.

In some embodiments, there may be two kinds of analytics that are returned to the base station: radio analytics and video analytics. The radio analytics and video analytics may be used, e.g., for effective rate control by the edge transcoder and/or the basestation. Radio analytics may include receive signal strength, power and quality of the reference signal at the mobile device. Radio analytics may be used to determine the optimal bit rate for reliable transmission to a user device under a given channel condition. (The basestation may embed the reference signal in its transmissions to the mobile device, to facilitate such measurements.) Video analytics may include the state of buffer fullness or the rate of detected errors from the bit stream decoding process. The video analytics may be used to determine the optimal (often the minimum) bit rate required to deliver the maximum user experience within the constraints imposed by the channel condition. The design constraints for the analytics may include minimization of the processing performed by the mobile device to generate the analytics, and minimization of data size of the analytics, to conserve signaling bandwidth between basestation (BS) and mobile device.

In addition to saving wireless bandwidth, it is also desired to reduce the amount of data needed to be sent from the server farm (holding all the video content) to the edge of the network. By moving the transcoding function to the network edge and using a video encoder at the server farm to generate encoded versions of content titles, it reduces the amount of data traffic through the internet and the storage requirement of the cloud servers regardless of whether the communication medium used to deliver data to the user device is wired or wireless.

As noted above, the network edge transcoder encodes an encoded video stream and customizes that stream for the particular configuration of the given user device. The encoded video stream is generated from a source video stream by a video encoder. The video encoder may also generate side information that eases the burden on the network edge transcoder in its action of transcoding the encoded video stream for the user device. The side information may be transmitted (or made available) to the network edge transcoder along with the encoded video stream.

In one of the disclosed embodiments, the video encoder may include digital circuitry and transmission circuitry.

The digital circuitry may be configured to perform, for each block of the input video stream, operations including: (a) receiving a plurality of prediction residuals corresponding respectively to a plurality of coding modes; (b) transforming the prediction residuals to obtain respective transform blocks for the respective coding modes; and (c) for each coding mode $M_k$, quantizing the transform block for the coding mode $M_k$ using each of one or more values of a quantization step size q to obtain one or more quantized versions of the transform block, and processing a collection of data including the one or more quantized versions of the transform block to obtain primary rate modeling data that characterizes a rate estimation function $R_k(q)$ for the coding mode $M_k$.

The transmission circuitry may be configured to transmit a side information stream onto a communication medium, wherein the side information stream includes the primary modeling data for each coding mode and for each block.

In another one of the disclosed embodiments, a video transcoding system may include a decoder, a scaling unit and an output encoder.

The decoder may be configured to receive and decode a first encoded video stream to obtain a decoded video stream.

The scaling unit may be configured to scale the decoded video stream to a target picture resolution in order to obtain a scaled video stream.

The output encoder may be configured to receive a side information stream associated with the first encoded video stream, and encode the scaled video stream using the side information stream in order to obtain a second encoded video stream.

The first encoded video stream may be interpreted as an encoded version of a source video stream. The side information stream may include metadata that characterizes properties of the source video stream. For example, the side information stream may include information characterizing rate and/or distortion properties of blocks in the source video stream. As another example, the side information may include motion vectors for blocks in the source video stream.

The side information stream may be used by the output encoder to make optimal (or near optimal) coding decisions in a computationally efficient manner, e.g., decisions on which coding mode to use for a given block, or what value of quantization step size to use for a given block, or which one or more motion vectors are likely to give optimal inter predictions for a given block, etc.

In some embodiments, the side information stream includes N rate information streams corresponding to N respective coding modes, wherein N is greater than or equal to one, wherein each rate information stream $RIS_k$ of the N rate information streams characterizes a corresponding rate estimation function $R_k(q)$ per block of the first encoded video stream assuming block prediction based on the respective coding mode, wherein q is a quantization step size.

In yet another one of the disclosed embodiments, a system may include a cache, a plurality of video transcoder devices, and a controller.

The cache stores a collection of video content items including a first video content item, wherein each of the video content items includes a corresponding encoded video stream and corresponding side information stream, wherein the side information stream of each video content item includes one or more rate information streams corresponding to one or more respective coding modes, wherein each rate information stream $RIS_k$ of the one or more rate information streams characterizes a corresponding rate estimation function $R_k(q)$ per block of the corresponding encoded video stream, assuming block prediction based on the respective coding mode, wherein q is a quantization step size.

In response to each of a plurality of content requests for the first video content item from a respective plurality of user devices, the controller may be configured to assign an available one of the video transcoder devices to serve the respective user device, wherein the user devices have respectively different configurations of video processing capability (VPC).

Each assigned video transcoder device may be configured to: (a) receive the encoded video stream and side information stream of the first content item from the cache; (b) transcode the encoded video stream using the side information stream and according to the VPC configuration of the respective user device, in order to obtain a respective target encoded video stream; and (c) transmit the respective target encoded video stream to the respective user device through a communication medium.

These and other features and advantages will become apparent to those of ordinary skill in the art in view of the following detailed descriptions of the approaches presented herein.

BRIEF DESCRIPTION OF THE DRAWINGS

A better understanding of the present invention can be obtained when the following detailed description is considered in conjunction with the following diagrams, in which:

FIG. 8 illustrates an embodiment of a video encoder 700 that generates primary distortion modeling data as well as primary rate modeling data.

FIG. 9 illustrates an embodiment of a video encoder 900 that generates rate modeling data 915.

Figure 1:
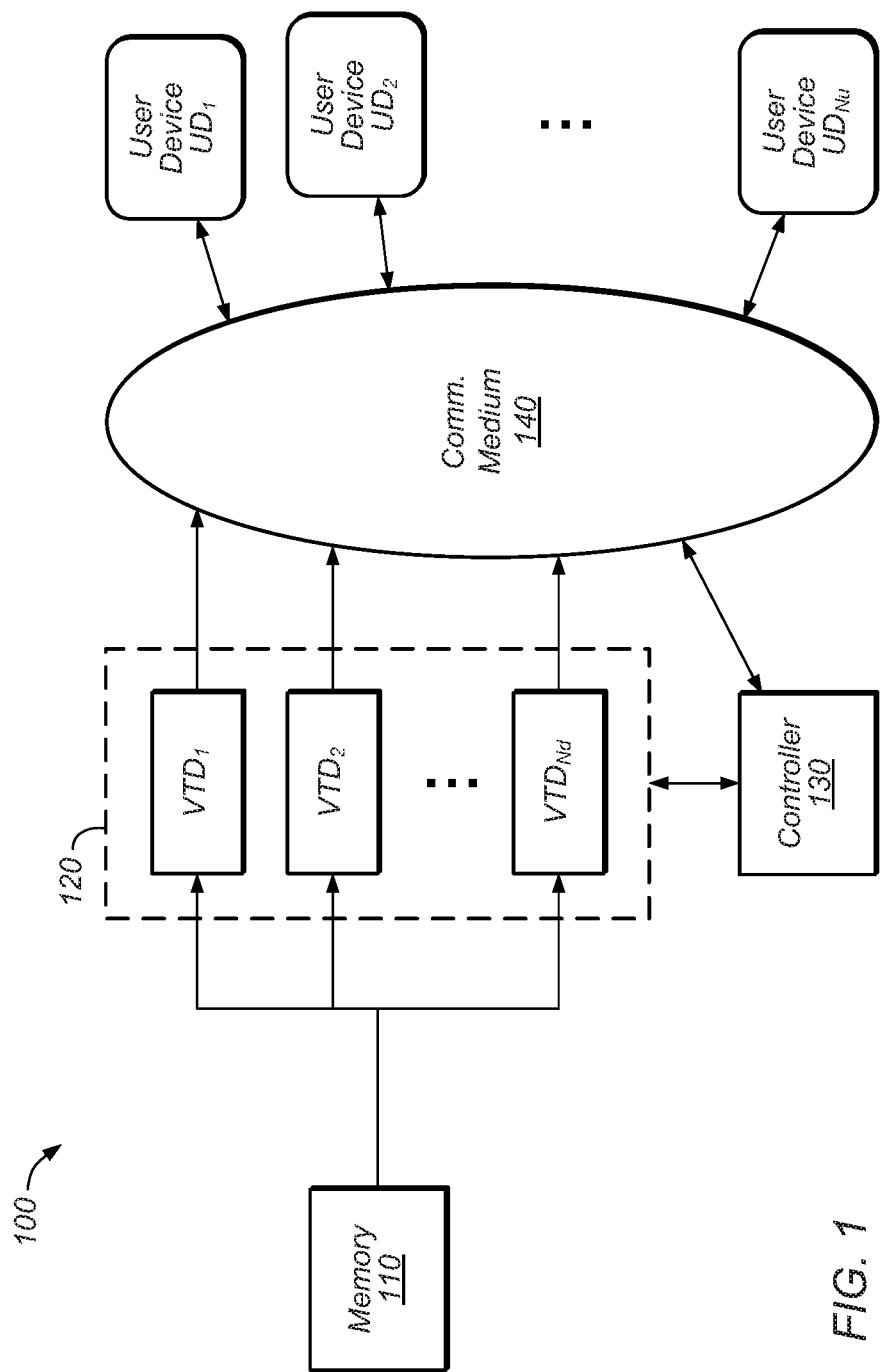
FIG. 1 illustrates one embodiment of a system 100 for delivering video content to user devices.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporations by Reference

The following references are hereby incorporated by reference in their entirety as though fully and completely set forth herein:

U.S. Provisional Application Ser. No. 61/658,761, titled "Rate Control for Video Compression", filed Jun. 12, 2012.

U.S. Pat. No. 7,415,594 titled "Processing System With Interspersed Stall Propagating Processors and Communication Elements," issued Aug. 19, 2008.

U.S. Pat. No. 8,151,305 titled "Mobile Television Broadcast System," issued Apr. 3, 2012.

Gary J. Sullivan and Thomas Wiegand, "Rate-distortion optimization for video compression," IEEE Signal Processing Magazine, November 1998, pp. 74-90.

Xiang Li et al, "Laplace distribution-based Lagrangian rate distortion optimization for Hybrid Video Coding," IEEE Trans. Circuits and Systems for Video Technology, vol. 19, no. 2, pp. 193-205.

Technical References

J. Choi and D. Park, "A stable feedback control of the buffer state using the controlled Lagrange multiplier method," IEEE Trans. Image Processing, vol. 3, no. 5, pp. 546-558, September 1994.

K.-P. Lim, G. Sullivan, T. Wiegand, "Text description of joint model reference encoding methods and decoding concealment methods," Joint Video Team of ISO/IEC MPEG and ITU-T VCEG Document, JVT-X101, Geneva, June, 2007.

Loren Merritt and Rahul Vanam, "Improved rate control and Motion Estimation for H.264 Encoder," Image Processing, 2007, ICIP 2007. Vol. 5, pages V-309-V-312.

Thomas Wiegand, Michael Lightstone, Debargha Mukherjee, T. George Campbell, Sanjit K. Mitra, "Rate-Distortion Optimized Mode Selection for Very Low Bit Rate Video Coding and the Emerging H.263 Standard," Circuits and Systems for Video Technology, IEEE Transactions on (Volume: 6, Issue: 2), April 1996, pp. 182-190.

Liang-jin Lin, Antonio Ortega, "Bit-Rate Control Using Piecewise Approximated Rate-Distortion Characteristics," Circuits and Systems for Video Technology, IEEE Transactions on (Volume: 8, Issue: 4), August 1996, pp. 446-459.

L-J Lin, A Ortega, C-C J Kuo, "A gradient-based rate control algorithm with applications to MPEG video," Image Processing, 1995. Proceedings, International Conference on (Volume: 3), Washington, D.C., 23-26 Oct. 1995, pp. 392-395.

TERMINOLOGY

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Block: a coding unit of a picture. For example, in AVC/H.264, block may be understood as macroblock. As another example, in HEVC/H.265, block may be understood as a Coding Tree Unit (CTU).

Rate: the number of bits associated with a block or picture in the final bitstream of the picture.

Distortion: may be understood as the sum of square error (SSE) between the reconstructed image block (after DCT, quant, inverse quant, inverse DCT) and source image block. Other distortion measures than SSE may be used as well.

Residual block: the difference block between a predicted block and source image block.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

System 100

In one set of embodiments, a system 100 may be configured as shown in FIG. 1. The system 100 may be used in a wide variety of contexts and applications. In one application, the system 100 may be used as part of a content delivery network (CDN). The system 100 may include a memory 110, a collection 120 of one or more video transcoder devices $VTD_1, VTD_2, \ldots, VTD_{Nd}$, and a controller 130. $N_d$ denotes the number of the one or more video transcoder devices. (The system 100 may also include any subset of the features, elements and embodiments described above and below in connection with FIGS. 2-17.) The one or more video transcoder devices may be configured as variously described below.

In some embodiments, the memory, the one or more video transcoder devices and the controller may be geographically distributed. For example, in one embodiment, the memory may be situated at one geographical location while the one or more video transcoder devices are at another geographical location. In this embodiment, the controller may be situated at the same location as the one or more video transcoder devices, or alternatively, situated at the same location as the memory, or, as another alternative, split between the two locations, or, as yet another alternative, situated at a third geographical location.

In some embodiments, the memory, the one or more video transcoder devices and the controller are geographically co-located. For example, those elements may be configured in the same box or chassis or electronics rack, or, as part of the same server farm, or, as part of the same electronics board, or as part of the same integrated circuit.

In some embodiments, the one or more video transcoder devices and/or the controller may be situated at or near (e.g., coupled to, or incorporated as part of) a basestation of a wireless network. Each video transcoder device may generate a customized user bitstream for a respective one of the user devices in the neighborhood (e.g., cell) of the basestation. The basestation may multiplex the customized user bitstreams into a transmit signal, e.g., using any of a wide variety of conventional multiplexing techniques, and transmit the transmit signal into space. Each user device may receive the transmit signal and recover the appropriate one of the customized user bitstreams from the received transmit signal.

In some embodiments, a CDN operator may employ a plurality of copies of the system 100, which are distributed to cover a geographical area or region of service.

The memory 110 may store a collection of video content items. Each of the video content items may include a corresponding encoded video stream and corresponding side information stream. In some embodiments, the memory 110 may include persistent or nonvolatile memory storage such as hard disk drives or flash memory, and/or, transient memory storage such as SRAM, DRAM, etc. In some embodiments, memory 110 may function as a cache for video content.

In this section, we will highlight how the system 100 responds when a plurality of user devices requests the same video content item. However, it should be understood that in the more general context, user devices may request arbitrary or random ones of the content items. Popular ones of the content items may have more requests per unit time than less popular content items. Thus, it is possible that multiple user devices may request the same content item.

In response to each of a plurality of content requests for a given video content item from a respective plurality of user devices $UD_1, UD_2, \ldots, UD_{Nu}$, the controller 130 may be configured to assign an available one of the one or more video transcoder devices to serve the respective user device. The user devices may have respectively different configurations of video processing capability (VPC). Each assigned video transcoder device may be configured to: (1) receive the encoded video stream and side information stream of the given content item, e.g., from the memory; (2) transcode the encoded video stream using the side information stream and according to the VPC configuration of the respective user device, in order to obtain a respective target encoded video stream; and (3) transmit the respective target encoded video stream to the respective user device through a communication medium 140 (such as a wireless transmission medium, or a wireless network, or a wired network, or a combination of wired and wireless networks, or the Internet). In particular, note that the system 100 is able to serve the multiple differently-configured user devices from a single cached copy of the video content item. The one or more video transcoder devices handle the customization of the target encoded video streams for the respective user devices. Thus, it is not necessary to cache multiple copies of the video content item at different combinations of target picture resolution, target bit rate and target video format in order to support the user devices. This allows a much larger number of video content items to be stored in the cache 110, and significantly decreases the probability of cache misses. (A cache miss is said to occur when a user device requests a video content item that is not present in the memory 110.)

When a cache miss occurs for a given requested content item, the system 100 may need to download the content item from a central content repository (or media source). The channel between the central content repository and the system 100 may be owned by entities other than the CDN operator. (For example, the channel may be the Internet.) Thus, there may be costs associated with downloading content over the channel. The decrease in cache miss probability implies a decrease in the download traffic from the central repositories, and thus, a decrease in costs.

In some embodiments, the encoded video stream of the given content item may be interpreted as an encoded version of a given source video stream. The side information stream may include metadata that characterizes properties of the given source video stream. For example, the metadata may include one or more candidate motion vectors per block of the encoded video stream. As another example, the metadata may include rate modeling data per block of the encoded video stream. As yet another embodiment, the metadata may include distortion modeling data per block of the encoded video stream of the given content item.

In some embodiments, the communication medium 140 may be a wireless transmission medium or the air interface of a wireless network. In one embodiment, at least one of the one or more video transcoder devices is coupled to or incorporated as part of a base station (or access point) of a wireless communication network. One or more (or all) of the user devices may be configured for wireless communication with the base station. The user devices may receive their respective target encoded video streams via wireless transmissions from the base station. Some or all of the user devices may be mobile devices.

The controller 130 may be configured to assign a given one of the one or more video transcoder devices to different ones of the user devices at different times. For example, when a video transcoder device finishes serving a first user device, it may become available for serving a second user device. Thus, even in embodiments of system 100 that include only one video transcoder device, the benefit of serving multiple differently-configured user devices from a single stored copy of a content item is realized.

In some embodiments, the system 100 may also include a source encoder. The source encoder may be configured to encode source video streams to generate respective ones of the content items. Each of the one or more video transcoder devices may be more power efficient than the source encoder, and/or, more space efficient than the source encoder. In some embodiments, a content item is not necessarily stored in memory 110 prior to delivery to a user device. For example, a content item may be delivered in connection with a live event. Thus, a video content item may be streamed from the source encoder to an assigned one of the video transcoder devices, and then immediately transcoded and transmitted to the user device.

In some embodiments, the side information stream of each video content item may include one or more rate information streams corresponding to one or more respective coding modes. (The one or more coding modes may include one or more inter modes, and/or, one or more intra modes.) Each rate information stream $RIS_k$ of the one or more rate information streams may characterize a corresponding rate estimation function $R_k(q)$ per block of the corresponding encoded video stream, assuming block prediction based on the respective coding mode. The variable q is a quantization step size.

In some embodiments, the side information stream of each video content item may include one or more distortion information streams corresponding to one or more respective coding modes. Each distortion information stream $DIS_k$ of the one or more distortion information streams may characterize a corresponding distortion function $D_k(q)$ per block of the encoded video stream of the video content item, assuming block prediction based on the respective coding mode.

In some embodiments, a given one (or each) of the video transcoder devices may be configured to perform the action of transcoding the encoded video stream by: decoding the encoded video stream to obtain a decoded video stream; scaling the decoded video stream to a target picture resolution of the respective user device, in order to obtain a scaled video stream; and encoding the scaled video stream using the side information and according to the VPC configuration of the respective user device, in order to obtain the respective target encoded video stream.

In some embodiments, the given video transcoder device may be configured to: perform said encoding of the scaled video stream by minimizing a Lagrangian rate-distortion function parameterized by a scalar value λ; and dynamically adjust the scalar value λ and an output bit rate of the respective target encoded video stream using the side information in order to prevent overflow and underflow of a coded picture buffer that receives the respective target encoded video stream at the respective user device.

In some embodiments, the given video transcoder device may be configured to: compute an error between an estimated occupancy of the coded picture buffer and a theoretical occupancy of the coded picture buffer if the respective target encoded video stream were maintained at a target bit rate; and perform said dynamic adjustment of the scalar value λ in order to decrease the magnitude of the error.

In some embodiments, the controller 130 may be configured to: receive messages or reports (e.g., analytics) from the user device being served by the given video transcoder device, where each of the reports includes analytical information from the user device; and in response to each of the reports, update a target bit rate and/or the target picture resolution used by the given video transcoder device to encode the scaled video stream.

In some embodiments, the analytical information may include information about quality of a link between the given video transcoder device and the user device. For example, link quality information may include one or more of the following: bit and/or packet error rates, throughput, received signal strength, and communication latency. The controller 130 may be configured to decrease or increase the target bit rate and/or the target picture resolution used by the given video transcoder device when the information about link quality indicates that the link quality has decreased or increased, respectively.

In some embodiments, the analytical information includes information about the quality of video recovered (by the user device) from the target encoded video stream transmitted by the video transcoder device. (Examples of video quality information might include dropped frame indications.) The controller may be configured to decrease or increase the target bit rate and/or the target picture resolution used by the given video transcoder device when the information about video quality indicates that the video quality has decreased or increased, respectively. In one embodiment, the reports on video quality may be made in parallel with the report on link quality.

In some embodiments, the controller may be configured to: receive reports from the user device being served by the given video transcoder device, where each of the reports includes a corresponding update to the VPC configuration of the user device; and in response to each of the reports, update the target picture resolution used by the first video transcoder device to encode the scaled video stream. (For example, the VPC configuration update may include a current target picture resolution that is acceptable to the user device.)

In some embodiments, the VPC configuration of each user device may include an identification of one or more of: a video coding format requested by the user device; and a target picture resolution requested by the user device.

In some embodiments, the VPC configurations of the respective user devices may span an M-dimensional configuration space, where M is at least two. The M-dimensional configuration space may have at least a first dimension corresponding to a choice of video format and a second dimension corresponding to a selection of picture resolution for the target encoded video stream to be received by the user device.

In some embodiments, the controller 130 may also be configured to: store (e.g., in the memory 110) the target encoded video stream generated by a given one of the one or more video transcoder devices that has been assigned to serve a first of the user devices; and direct a transmission of the stored target encoded video stream to a second user device in response to detecting that the second user device has a same or similar VPC configuration as the first user device. If a first user device requests the given video content item, there may be a substantial probability that a second identically configured (or similarly configured) user device will request the given video content item in the near future. Thus, the caching of the target encoded video streams generated by the video encoder devices may increase system efficiency.

Figure 2:
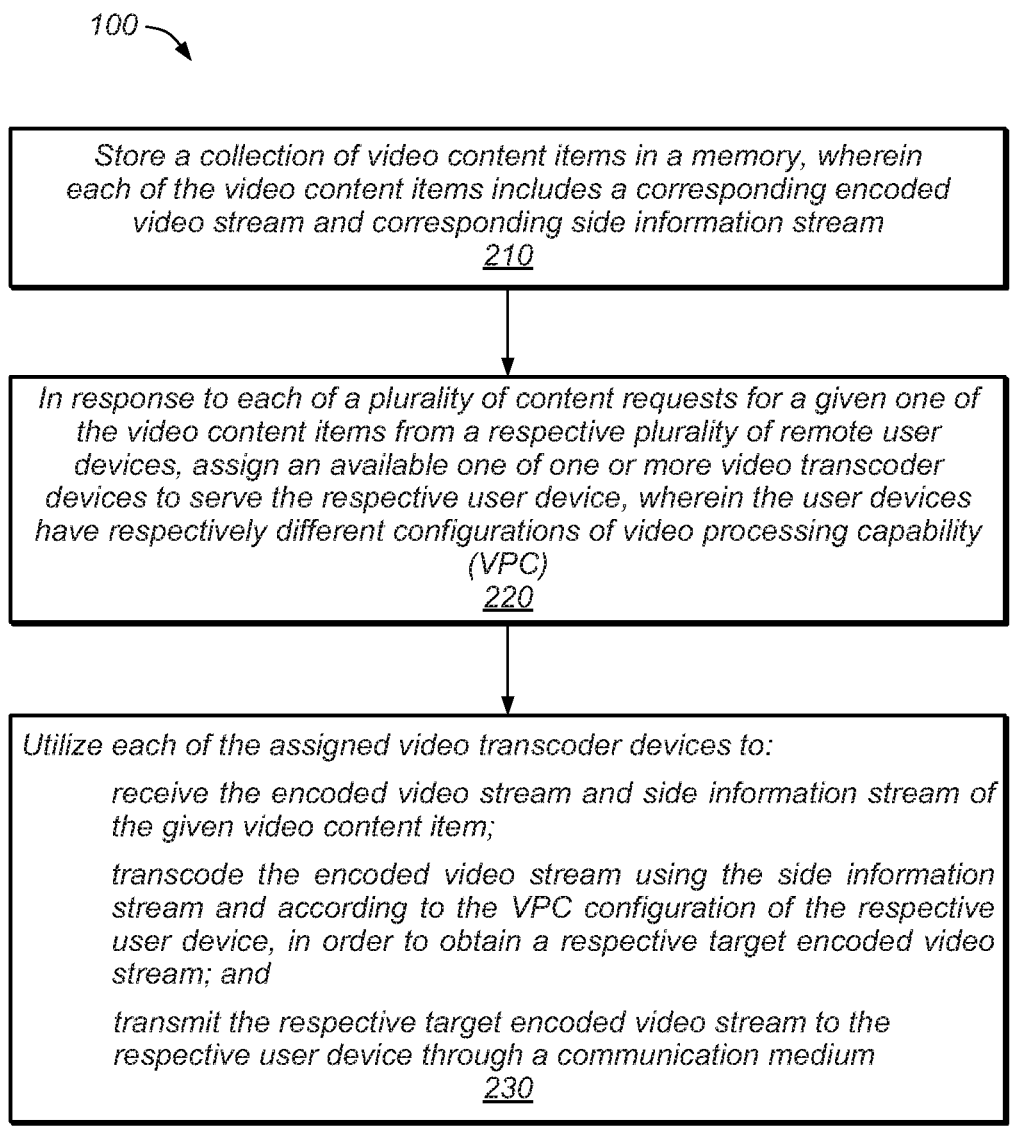
FIG. 2 illustrates one embodiment of a method 200 for delivering video content to user devices.

In one set of embodiments, a method 200 for delivering video content to user devices may involve the operations shown in FIG. 2. (The method 200 may also include any subset of the features, elements and embodiments described above and below in connection with FIGS. 1 and 3-17.)

At 210, a collection of video content items may be stored in a memory. Each of the video content items may include a corresponding encoded video stream and corresponding side information stream.

At 220, in response to each of a plurality of content requests for a given one of the video content items from a respective plurality of remote user devices, an available one of one or more video transcoder devices may be assigned to serve the respective user device. The user devices may have respectively different configurations of video processing capability (VPC).

At 230, the method 200 may utilize each of the assigned video transcoder devices to: (a) receive the encoded video stream and side information stream of the given video content item, e.g., from the memory; (b) transcode the encoded video stream using the side information stream and according to the VPC configuration of the respective user device, in order to obtain a respective target encoded video stream; and (c) transmit the respective target encoded video stream to the respective user device through a communication medium (such as a wireless transmission medium, a wireless network, or a wired network, or as variously described above).

In some embodiments, the encoded video stream of the given video content item may be interpreted as an encoded version of a given source video stream. The side information stream may include metadata that characterizes properties of the given source video stream. In one embodiment, the metadata may include one or more candidate motion vectors per block of the encoded video stream. In another embodiment, the metadata may include rate modeling data per block of the encoded video stream of the given video content item. In yet another, the metadata includes distortion modeling data per block of the encoded video stream of the given video content item. Of course, embodiments are contemplated whereby any combination of the foregoing types of metadata are combined.

In some embodiments, the side information stream of each video content item may include one or more rate information streams corresponding to one or more respective coding modes. Each rate information stream $RIS_k$ of the one or more rate information streams may characterize a corresponding rate estimation function $R_k(q)$ per block of the corresponding encoded video stream, assuming block prediction based on the respective coding mode, where q is a quantization step size.

In some embodiments, the side information stream of each video content item may include one or more distortion information streams corresponding to one or more respective coding modes. Each distortion information stream $DIS_k$ of the one or more distortion information streams may characterize a corresponding distortion function $D_k(q)$ per block of the encoded video stream of the given video content item, assuming block prediction based on the respective coding mode, wherein q is a quantization step size.

In some embodiments, the method 200 may also include encoding source video streams to generate respective ones of the content items. The action of encoding the source video stream may be performed by a source encoder (e.g., by the mezzanine encoder 510, the video encoder 700 or the video encoder 900, described further below). Each of the video transcoder devices may be more power efficient than the source encoder, and/or, more space efficient than the source encoder.

In some embodiments, the method 200 may also include: (a) receiving reports from the user device being served by a given one of the one or more video transcoder devices, wherein each of the reports includes analytical information from the user device; and (b) in response to each of the reports, updating a target bit rate and/or the target picture resolution used by the given video transcoder device to perform said transcoding of the encoded video stream.

In some embodiments, the analytical information includes information about quality of a link between the given video transcoder device and the user device.

In some embodiments, the method 200 may also include decreasing or increasing the target bit rate and/or the target picture resolution used by the given video transcoder device when the information about link quality indicates that the link quality has decreased or increased, respectively.

In some embodiments, the analytical information includes information about the quality of video recovered (by the user device) from the respective target encoded video stream transmitted by the given video transcoder device.

In some embodiments, the method 200 may also include decreasing or increasing the target bit rate and/or the target picture resolution used by the given video transcoder device when the information about video quality indicates that the video quality has decreased or increased, respectively.

In some embodiments, the method 200 may also include: receiving reports from the user device being served by the given video transcoder device, wherein each of the reports includes a corresponding update to the VPC configuration of the user device (e.g., an update indicating a current target picture resolution that is acceptable to the user device); and in response to each of the reports, updating the target picture resolution used by the given video transcoder device to encode the scaled video stream.

In some embodiments, the VPC configuration of each user device may include an identification of a video coding format requested by the user device. In these embodiments, the action of transcoding the encoded video stream may be performed so that the respective target encoded video stream conforms to the requested video coding format.

In some embodiments, the VPC configuration of each user device may include an identification of a target picture resolution requested by the user device. In these embodiments, the action of transcoding the encoded video stream may be performed so that the respective target encoded video stream has the requested target picture resolution.

In some embodiments, the VPC configuration of each user device may include an identification of a target bit rate requested by the user device. In these embodiments, the action of transcoding the encoded video stream may be performed so that the respective target encoded video stream has an average output bit rate approximately equal to the target bit rate.

In some embodiments, the method 200 may also include: (a) storing (e.g., in the memory) the target encoded video stream generated by a given one of the one or more video transcoder devices that has been assigned to serve a first of the user devices; and (b) directing a transmission of the stored target encoded video stream to a second user device in response to detecting that the second user device has a same or similar VPC configuration as the first user device.

Content Delivery Network Using Split Encoder Architecture

Figure 3:
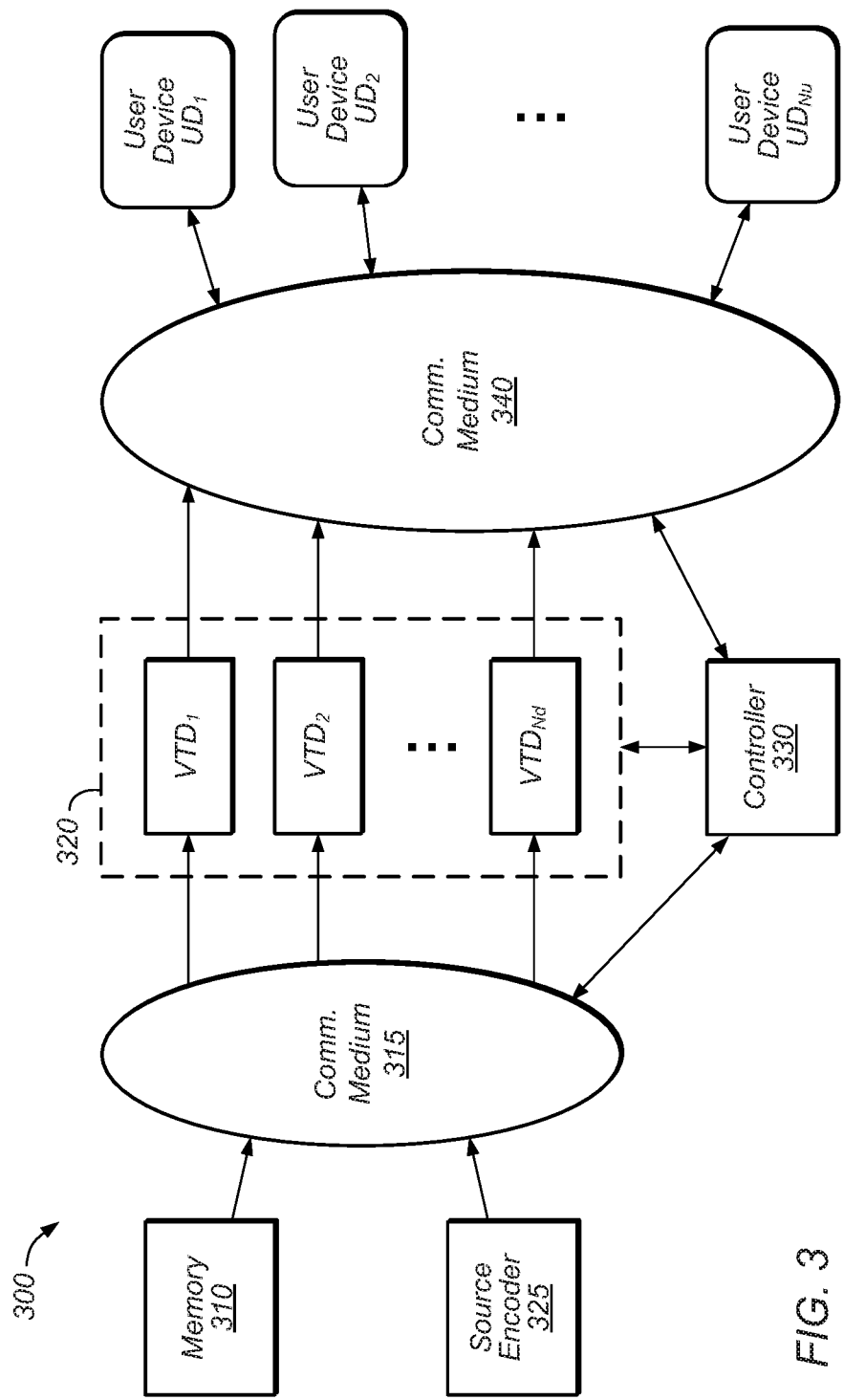
FIG. 3 illustrates an embodiment of a system 300 for delivering video content to user devices.

In one set of embodiments, a content delivery network 300 may be configured as shown in FIG. 3. The content delivery network 300 may include a memory 310, a plurality of video transcoder devices $VTD_1$, $VTD_2$, . . . , $VTD_{Nd}$ (collectively referred to with the label 320), and a controller 330. (The content delivery network may also include any subset of the features, elements and embodiments described above and below in connection with FIGS. 1-2 and 4-17.)

The memory 310 may store a plurality of video content items. Each of the video content items may include a corresponding encoded video stream and corresponding side information stream. The memory 310 may couple to the video transcoder devices through a communication medium 915 (e.g., a private network controlled by the CDN operator, the Internet, or a wireless network.)

For each of a plurality of remote user devices $UD_1$, $UD_2$, . . . , $UD_{NU}$, the controller 330 may be configured to receive a request (e.g., via the communication medium 340) for a respective selected one of the content items from the remote user device, and direct the transfer of the respective selected content item to an available one of the video transcoder devices. Different user devices may select different ones or random ones of the content items.

Each video transcoder device $VTD_k$, k=1, 2, . . . , $N_d$, may be configured to: receive the encoded video stream and side information stream of a respective one of the content items; transcode the encoded video stream at a respective target picture resolution using the side information stream, in order to obtain a respective target encoded video stream; and transmit the respective target encoded video stream to a respective one of the remote user devices through the communication medium 340 (e.g., a wireless transmission medium, or a wireless network, or a wired network).

In some embodiments, the side information stream of each video content item may include N rate information streams corresponding to N respective coding modes, where N is greater than or equal to one. Each rate information stream $RIS_k$ of the N rate information streams may characterize a corresponding rate estimation function $R_k(q)$ per block of the encoded video stream of the video content item, assuming block prediction based on the respective coding mode. The variable q is a quantization step size.

In some embodiments, the content delivery network 300 may also include a source encoder 325 configured to encode source video streams to generate respective ones of the content items. The source encoder 325 may be configured as described below in connection with the mezzanine encoder 510 or the video encoder 500 or video encoder 900. Each of the video transcoder devices may be configured to consume less power than the source encoder, and occupy less space than the source encoder. These constraints may be achieved in part because the provision of the side information stream as input to a video transcoder device along with the encoded video stream allows the video transcoder device to omit circuitry and/or program instructions for its own computation of the side information.

In some embodiments, each video transcoder device may be configured to perform the action of transcoding by: decoding the encoded video stream to obtain a respective decoded video stream; and encoding the respective decoded video stream at the respective target picture resolution using the side information stream, in order to obtain the respective target encoded video stream.

In some embodiments, each video transcoder device may be configured to: encode the respective decoded video stream based on Lagrange optimization using a respective rate distortion function parameterized by scalar value $\lambda$; and dynamically adjust the scalar value $\lambda$ based on the side information stream of the respective selected content item in order to prevent overflow or underflow of a coded picture buffer of a decoder at the respective remote user device.

In some embodiments, the encoded video stream of each video content item may be interpreted an encoded version of a respective source video stream. The side information stream of each video content item may include metadata that characterizes properties of the respective source video stream.

In some embodiments, the controller may be configured to communicate with a processing node (such as an authentication server) that provides user authentication, e.g., based on identification information provided by the user device as part of the above-described request or as a separate transmission. The controller may receive a validity signal from the processing node, indicating that a given user (or user device) has been authenticated as a valid user (or user device). Furthermore, the controller may receive a permission-to-send signal, e.g., from the processing node, indicating that the controller is permitted to start transmitting the requested video content to the requesting user device.

In some embodiments, the controller may be configured to provide each of the video transcoder devices with corresponding auxiliary information for injection into the respective target encoded video stream. The corresponding auxiliary information may include one or more of: branding information of a business entity; advertising information; digital rights management (DRM) information; digital information providing watermark functionality; and one or more customization features requested by a content provider, content delivery service provider, customer or user.

In some embodiments, the digital watermark information may be individualized to the user or user device that has requested video content. Thus, if the video content is used improperly, the identity of the user may be identified from the digital watermark information.

In some embodiments, each of the video transcoder devices may be configured to receive corresponding auxiliary information and inject the corresponding auxiliary information into the respective target encoded video stream. The auxiliary information may include one or more of: branding information of a business entity; advertising information; digital rights management (DRM) information; and one or more customization features requested by a content provider, content delivery service provider, customer or user.

Additional embodiments are disclosed in the following numbered paragraphs.

1. A system (e.g., a content delivery network) comprising: a memory that stores a plurality of video content items, wherein each of the video content items includes a corresponding encoded video stream and corresponding side information stream; a plurality of video transcoder devices; and a controller, wherein, for each of a plurality of remote user devices, the controller is configured to receive a request for a respective one of the content items from the remote user device, and direct the transfer of the respective content item to an available one of the video transcoder devices; wherein each of the video transcoder devices is configured to: receive the encoded video stream and side information stream of the respective content item; transcode the encoded video stream at a respective target picture resolution using the side information stream, in order to obtain a respective target encoded video stream; and transmit the respective target encoded video stream to a respective one of the remote user devices through a communication medium.

2. The system of paragraph 1, wherein the controller is configured to: receive link reports from a first of the user devices that is assigned to a first of the video transcoder devices, wherein each of the link reports indicates a respective condition of a channel between the first video transcoder device and the first user device; and update a target bit rate used by the first video transcoder device to transcode the encoded video stream in response to each of the link reports.

3. The system of paragraph 1, wherein the encoded video stream of each of the video content items is an encoded version of a respective source video stream, wherein the side information stream of each of the video content items includes metadata that characterizes properties of the respective source video stream.

4. The system of paragraph 3, wherein the metadata includes one or more candidate motion vectors per block of the corresponding encoded video stream.

5. The system of paragraph 3, wherein the metadata includes rate modeling data per block of the corresponding encoded video stream.

6. The system of paragraph 3, wherein the metadata includes distortion modeling data per block of the corresponding encoded video stream.

7. The system of paragraph 1, wherein the side information stream of each video content item includes N rate information streams corresponding to N respective coding modes, wherein N is greater than or equal to one, wherein each rate information stream $RIS_k$ of the N rate information streams characterizes a corresponding rate estimation function $R_k(q)$ per block of the encoded video stream of the video content item, assuming block prediction based on the respective coding mode, wherein q is a quantization step size.

8. The system of paragraph 1, wherein the side information stream of each video content item includes one or more distortion information streams corresponding to one or more respective coding modes, wherein each distortion information stream $DIS_k$ of the one or more distortion information streams characterizes a corresponding distortion function $D_k(q)$ per block of the encoded video stream of the video content item, assuming block prediction based on the respective coding mode, wherein q is a quantization step size.

9. The system of paragraph 1, further comprising a source encoder configured to encode source video streams to generate respective ones of the content items, wherein each of the video transcoder devices consumes less power than the source encoder, and occupies less space than the source encoder.

10. The system of paragraph 1, wherein each video transcoder device is configured to perform said transcoding by: decoding the encoded video stream to obtain a respective decoded video stream; and encoding the respective decoded video stream at the respective target picture resolution using the side information stream, in order to obtain the respective target encoded video stream.

11. The system of paragraph 1, wherein the controller is configured to provide each of the video transcoder devices with corresponding auxiliary information for injection into the respective target encoded video stream, wherein the corresponding auxiliary information includes one or more of: branding information of a business entity; advertising information; digital rights management (DRM) information; digital information providing watermark functionality; one or more customization features requested by a content provider, content delivery service provider, customer or user.

12. The system of paragraph 1, wherein each of the video transcoder devices is configured to receive corresponding auxiliary information and inject the corresponding auxiliary information into the respective target encoded video stream, wherein the corresponding auxiliary information includes one or more of: branding information of a business entity; advertising information; digital rights management (DRM) information; digital information providing watermark functionality; one or more customization features requested by a content provider, content delivery service provider, customer or user.

Network Edge Transcoder

Figure 4:
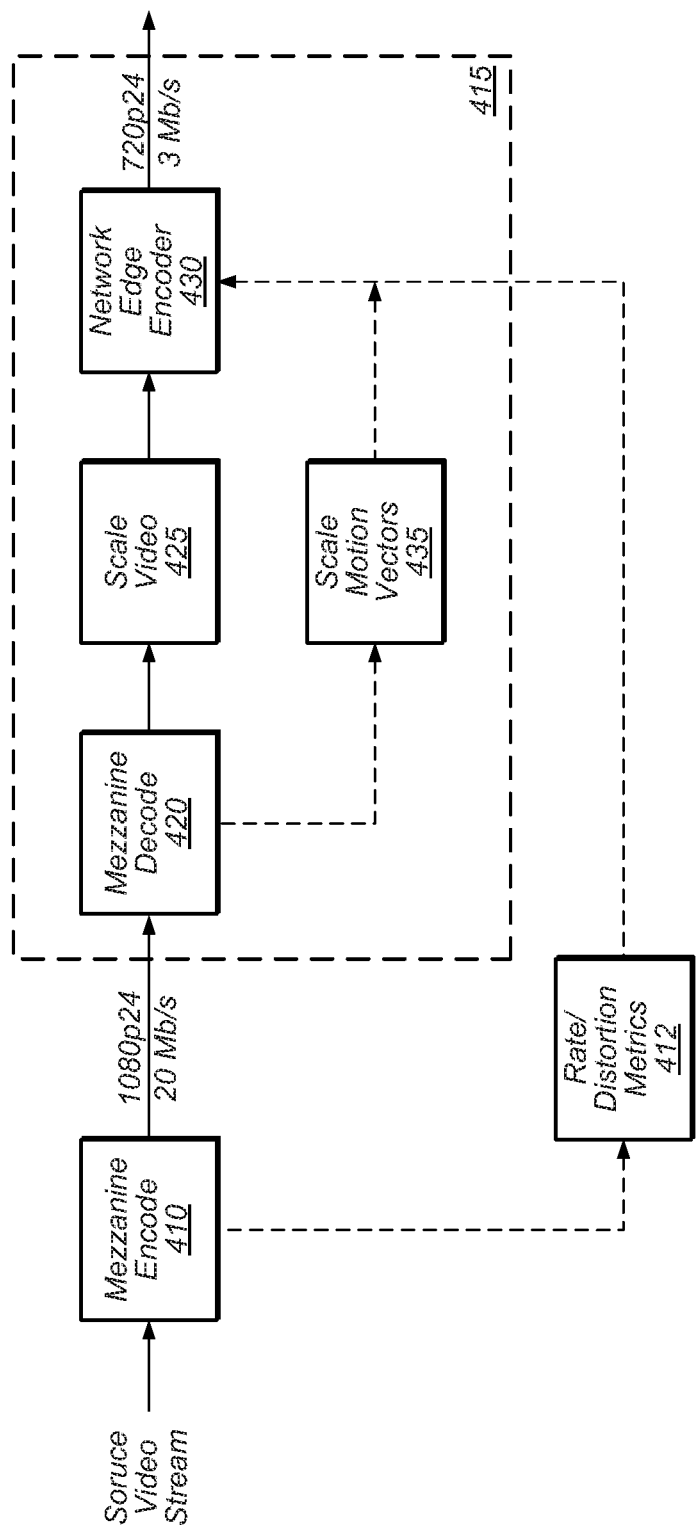
FIG. 4 illustrates one embodiment of a method for delivering content to clients using a network edge transcoder device 415.

FIG. 4 shows one embodiment of a method for delivering content to clients using a network edge transcoder. At 410, a content provider may perform a single mezzanine encoding per content title. The mezzanine encoding produces an encoded mezzanine stream file and a side information stream per content title.

The single encoded mezzanine stream file and the side information stream file for each content title may be uploaded to an origin server of a content delivery network (CDN). The network edge transcoder 415 may convert the mezzanine stream to an arbitrary resolution and bit rate using the side information stream, according to the requirements of each client. An http server (not shown) may cache one copy of each content title. The http server may receive an http segment request (i.e., a request for a segment of a particular content item) from a client, e.g., via the Internet. If the requested segment is not in the server cache, the http server may request the segment from an origin server (not shown). The origin server transfers the requested segment to the http server. Then the http server may supply the edge transcoder 415 with the requested segment (i.e., a portion of one of the encoded mezzanine streams). The edge transcoder may decode the requested segment to obtain a decoded stream, scale the decoded stream to obtain a scaled stream, and encode the scaled stream to obtain an output stream. The output stream is transferred to the client, e.g., via the Internet or a wireless network. The network edge transcoder converts the requested segment to an arbitrary resolution and arbitrary bit rate, according to the requirements of each client. The specific numeric values (such as 1080p24 and 20 Mb/s for the encoded mezzanine stream, and 720p24 and 3 Mb/s for the stream to client) shown in FIG. 4 are provided merely for the sake of illustration, and are not meant to be limiting to the scope of the inventive principles. A wide variety of bit rates and picture resolutions are contemplated for the various streams illustrated here and elsewhere in the drawings.

The mezzanine encoder 410 may encode a source video stream to generate the mezzanine bit stream. The mezzanine encoder 410 may also generate information (e.g., rate metrics and/or distortion metrics) during the mezzanine encode process. That information may be carried in a separate side information stream, or as user data in the mezzanine bitstream. For example, the rate and distortion metrics may be: used for rate control, adaptive quantization, HRD compliance in the encoder 430, i.e., for controlling the rate of the output bitstream transmitted from encoder 430 to the client. Thus, the combination of the mezzanine encoder 410 and the encoder 430 effectively forms a two-pass encoder. This architecture leverages the unlimited computational budget of mezzanine encoder to compute rate and distortion metrics (e.g., high quality metrics). It also minimizes the amount of computation the network edge encoder 430 needs to perform for effective rate control.

System 500 for Delivering Video Content

Figure 5:
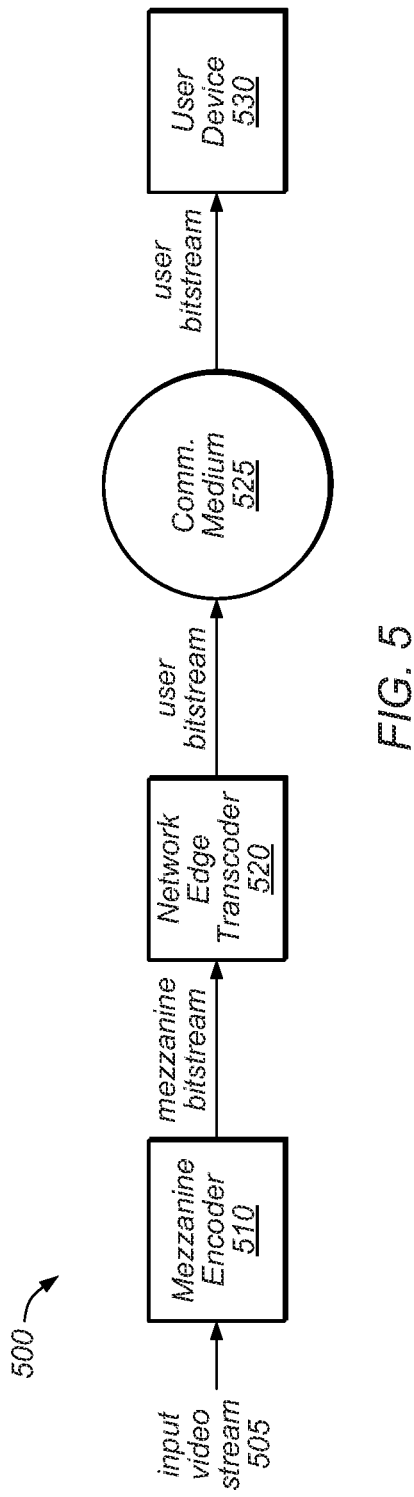
FIG. 5 illustrates one embodiment of an architecture 500 for delivering video content to user devices, involving a mezzanine encoder 510 and a network edge transcoder 520.

In one set of embodiments, a system 500 for delivering video content may include a mezzanine encoder 510, a network edge transcoder 520, a communication medium 525 (such as a wireless network, or a wired network, or a combination wireless and wired networks) and a user device 530, as shown in FIG. 5. The system 500 may be utilized as part of a content delivery network, or any of a wide variety of other applications.

The mezzanine encoder 510 receives an input video stream 505 (i.e., a sequence of pictures) and generates a mezzanine bit stream. The mezzanine bitstream may be an encoded video stream. (The mezzanine bitstream is so named because it has a position intermediate between the two devices 510 and 520. The mezzanine encoder is so named because it generates the mezzanine bitstream.) The mezzanine bit stream may be transmitted to the network edge transcoder 520, e.g., through a communication medium such as the Internet or a wireless network. In some embodiments, the mezzanine bit stream may be transmitted to a memory medium for storage, and then later retrieved from the memory medium by the network edge transcoder.

The mezzanine encoder may serve as the above-described source encoder of system 100 or method 200 or system 300.

The network edge transcoder 520 may receive the mezzanine bitstream and transcode the mezzanine bitstream according to a configuration of video processing capability (VPC) acceptable to, or requested by, the user device 530. The VPC configuration of the user device may include a requested picture resolution and/or a requested video format and/or a requested bit rate. Thus, the network edge transcoder generates a user bitstream that is customized for the user device. The user bitstream is transmitted to the user device 530 through a communication medium 525.

The network edge transcoder 520 may serve as the video transcoder device of system 100 or method 200 or system 300.

The network edge transcoder 520 is so named because it is situated at or near the edge of a network (such as a wireless network or a wired network or the Internet). For example, the network edge transcoder may be located at or near a wireless access point (e.g., base station) of a wireless network. As another example, the network edge transcoder may be located at or near the boundary node of a content delivery network. (A boundary node of the content delivery network is a processing node or device of the content delivery network that exports data out of the content delivery network towards the user device.) As yet another example, the network edge transcoder may be located at or near the headend of a cable or fiber optic connection to a modem that interfaces with the user device.

In some embodiments, the communication medium 525 may be a wireless network or the air interface of a wireless network. In one embodiment, the network edge transcoder 520 may supply the user bitstream to a basestation of the wireless network, and the basestation may transmit the user bitstream to the user device over the air interface. The user device may include a transceiver to receive the transmitted user bitstream and to transmit signals to the basestation. The user device may transmit messages regarding the quality of the viewing experience seen by the user. For example, the messages may include radio analytics such as receive signal strength, power and quality of a reference signal received at the user device that indicate the quality of the channel between the base station and the user device. The basestation may embed the reference signal in its transmissions to facilitate such measurements. Radio analytics may be used to determine the optimal bit rate for reliable transmission to the user device under a given channel condition. The messages may also include video analytics, e.g., messages regarding the quality of the video recovered from the user bitstream by the user device. The video analytics may be used to determine the optimal (often the minimum) bit rate required to deliver the maximum user experience within the constraints imposed by the channel condition. (The radio analytics and video analytics may be used by the network edge transcoder 520 to perform rate control in its generation of the user bitstream.)

In some embodiments, the communication medium 525 may include a wired network.

In some embodiments, the communication medium 525 may include the Internet.

Figure 6:
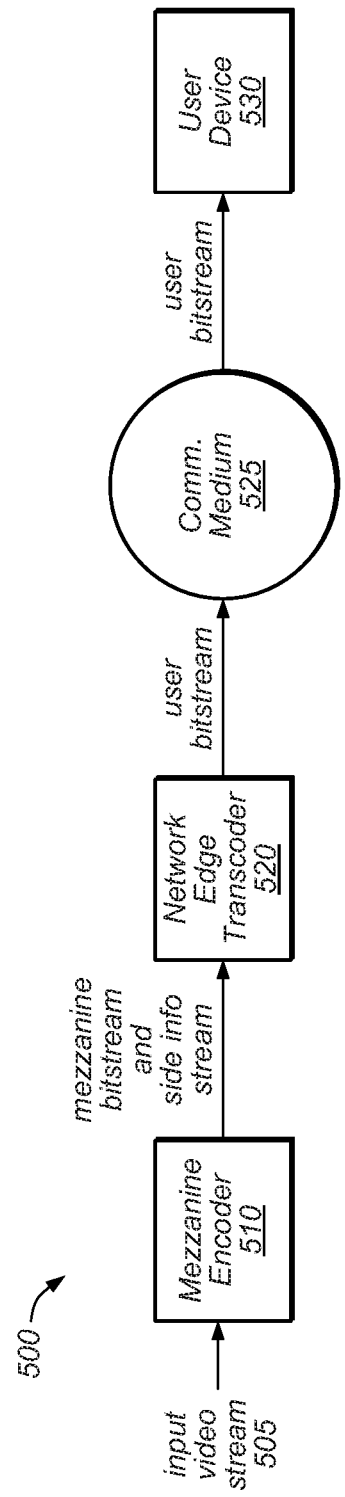
FIG. 6 illustrates another embodiment of the architecture 500, where mezzanine encoder 510 generates a side information stream as well as a mezzanine bitstream. The network edge transcoder 520 uses the side information stream in its encoding processes.

In some embodiments, the mezzanine encoder also transmits to the network edge encoder 520 a side information stream, as shown in FIG. 6. The side information stream may include metadata that characterizes properties of the input video stream 505, e.g., information that eases the burden on the network edge transcoder in its task of transcoding the mezzanine bitstream. For example, the side information stream may be used by the network edge transcoder 520 to apply rate control in its generation of the user bitstream. As another example, the side information stream may enable the network edge transcoder to arrive at optimal coding decisions (e.g., decisions on quantization step size, coding mode, motion vector selection) more efficiently than if the side information stream were not provided.

The side information stream may include information characterizing a rate estimation function R(q) and a distortion estimation function D(q) for each block in the input video stream, or at least for each block in selected pictures such as P pictures and B pictures. The rate estimation function R(q) for any given value of quantization step size q represents an estimate of the number of bits that would result from quantizing the transformed prediction residual for the block with a quantization step size equal to the given value, and then encoding the quantized result. The distortion estimation function D(q) for any given value of quantization step size q represents an estimate of the image distortion (relative to original image samples of the block) that would result from quantizing the transformed prediction residual for the block with a quantization step size equal to the given value, and then encoding the quantized result.

The side information stream may include a rate estimation function and a distortion estimation function for each block and each of N coding modes, wherein N is greater than or equal to one. The value of N may vary from picture to picture. For example, an I picture may include only intra modes, whereas a P or B picture may include one or more inter modes and one or more intra modes.

Video Encoder 700

Figure 7:
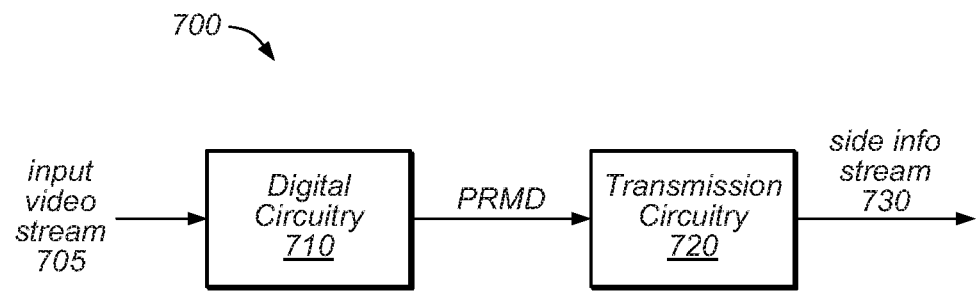
FIG. 7 illustrates one embodiment of a video encoder 700.

In one set of embodiments, a video encoder 700 (also referred to herein as the "mezzanine encoder") may be configured as shown in FIG. 7. The video encoder may be configured to operate on an input video stream 705 to generate a side information stream 730. The video encoder may also generate an encoded video stream. The video encoder 700 may include digital circuitry 710 and transmission circuitry 720. (The video encoder 700 may also include any subset of the features, elements and embodiments described above and below in connection with FIGS. 1-6 and 8-17.)

The digital circuitry 710 may be realized by one or more processors operating under the control of stored program instructions, by one or more dedicated digital circuits such as ASICs, by one or more programmable hardware elements such as FPGAs, or any combination of the foregoing. In one embodiment, the digital circuitry may include a parallel array of processors operating under the control of stored program instructions.

In some embodiments, the side information stream 730 may comprise rate modeling data per block of the input data stream.

In some embodiments, the side information stream 730 may comprise distortion modeling data per block of the input data stream.

In some embodiments, the side information stream 730 may comprise candidate motion vectors for each block of the input data stream.

In some embodiments, the side information 730 stream may include one or more rate information streams corresponding to one or more respective coding modes, wherein each rate information stream $RIS_k$ characterizes a corresponding rate estimation function $R_k(q)$ per block of the input video stream, where q is the quantization step size.

In some embodiments, the side information 730 stream may include one or more distortion information streams corresponding to one or more respective coding modes, wherein each distortion information stream $DIS_k$ characterizes a corresponding distortion estimation function $D_k(q)$ per block of the input video stream, where q is the quantization step size.

Figure 7B:
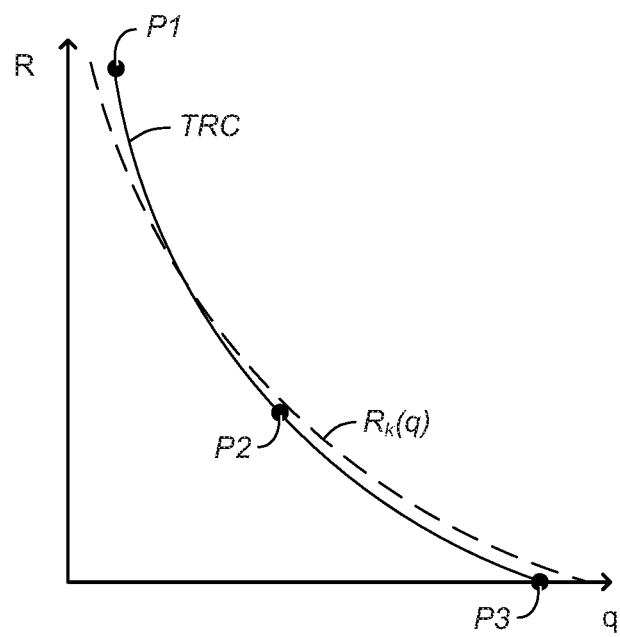
FIG. 7B illustrates an example of the process of generating a rate estimation function.

A typical rate characteristic TRC for a block of the input video stream for one coding mode is shown in FIG. 7B. In this embodiment, the rate estimation function $R_k(q)$ may be characterized by several reference points P1, P2, P3. Each reference point is the value of rate $R_k(q_v)$ for a corresponding value $q_v$ of the quantization step size.

In some embodiments, the process to determine the rate estimation function $R_k(q)$ includes computing several reference points, then fitting a continuous functional model to the reference points.

Figure 7C:
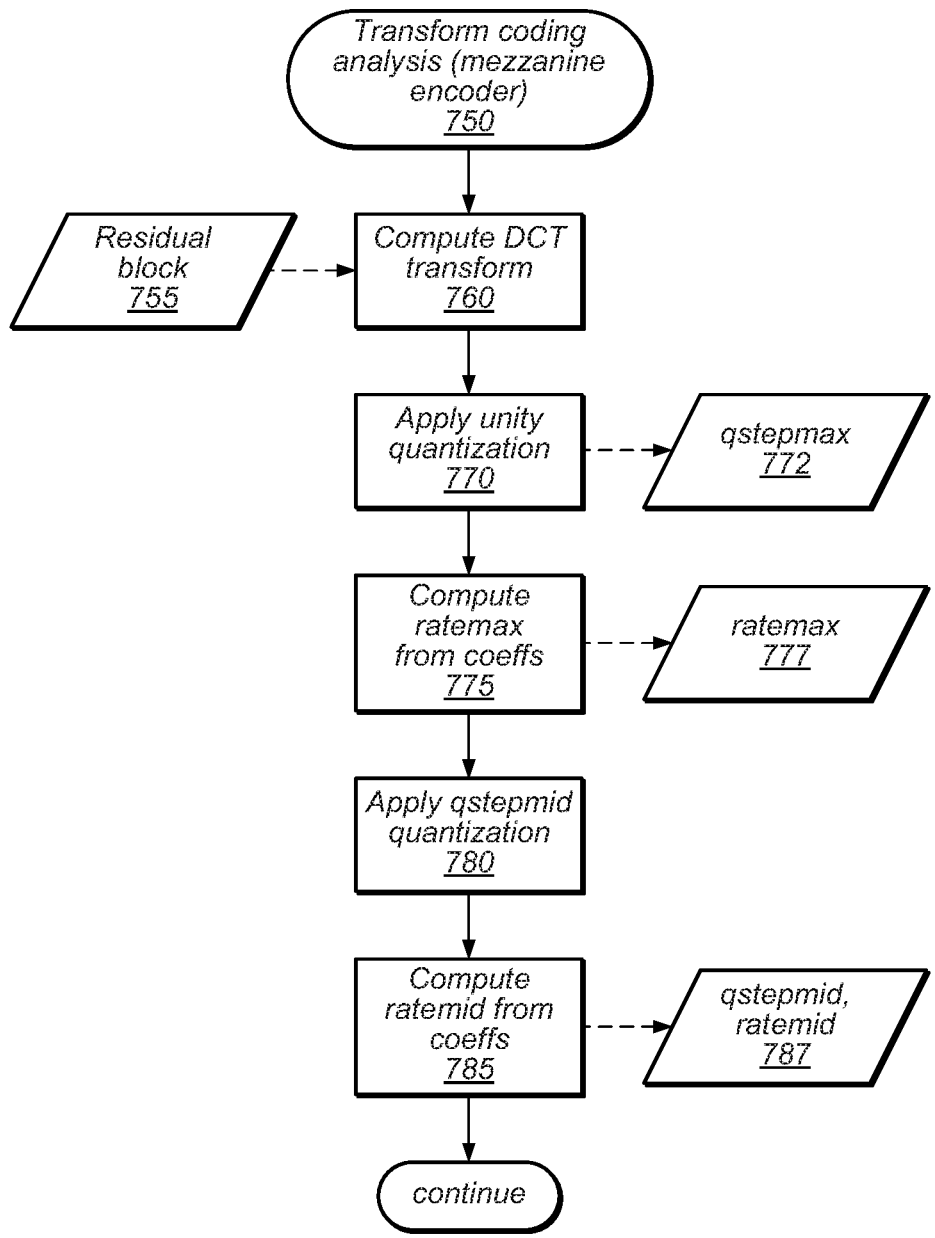
FIG. 7C illustrates a method 750 for computing parameters to be used in determining a rate estimation function.

FIG. 7C shows an example process flow to compute several reference points belonging to the rate characteristic for each block of the input video and for each coding mode. As part of the normal transform coding and mode decision processing for each block, the DCT is computed (as indicated at 760) for a residual block 755, resulting in unquantized coefficients. A unity quantizer (i.e., qstep=1) is applied at 770, and the resulting coefficients are processed to compute the maximum rate 777 that the block may produce. This provides the point (ratemax, qstepmin) on the rate(qstep) curve. Note that qstepmin=1.

The unity quantized coefficients are examined to determine the largest coefficient. This tells what value 772 of qstep would cause all the quantized coefficients to become zero. That value is referred at as qstepmax. This provides the point (ratemin, qstepmax) on the rate(qstep) curve. Note that ratemin=0.

Finally the unquantized coefficients are quantized again at 780 with a middle value of qstep as chosen for the actual encoding of the mezzanine bitstream that is neither lossless nor extremely compressed. (That middle value is denoted qstepmid.) The resulting coefficients are used to determine the point (ratemid, qstepmid) on the rate(qstep) curve. See 785 and 787.

Figure 7D:
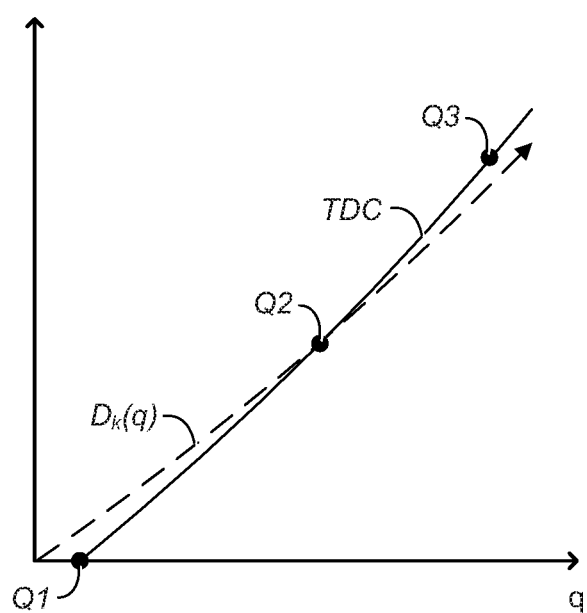
FIG. 7D illustrates an example of the process of generating a distortion estimation function.

A typical distortion characteristic TDC for a block of the input video stream for one coding mode is shown in FIG. 7D. In this embodiment, the distortion estimation function $D_k(q)$ may be characterized by several reference points Q1, Q2, Q3. Each reference point is the value of distortion $D_k(q_v)$ for a corresponding value $q_v$ of the quantization step size.

In some embodiments, the process to determine the distortion estimation function $D_k(q)$ includes computing several reference points, then fitting a continuous functional model to the reference points.

The digital circuitry 710 may be configured to perform the following operations for each block of the input video stream.

(A) The digital circuitry may receive a plurality of prediction residuals corresponding respectively to a plurality of coding modes. Each of the prediction residuals is a difference between the input block and the prediction for the corresponding coding mode. Each prediction may be an array of the same dimension as the input block.

(B) The digital circuitry may transform the prediction residuals to obtain respective transform blocks for the respective coding modes:

$TB_k \leftarrow \text{Tranform}(PR_k)$, k=1, 2, . . . , N. In some embodiments, the transform is a discrete cosine transform (DCT). However, other transforms may be used as well.

(C) For each coding mode $M_k$, the digital circuitry may quantize the transform block for the coding mode $M_k$ using each of one or more values of a quantization step size q to obtain one or more quantized versions of the transform block. The digital circuitry may process a collection of data including the one or more quantized versions of the transform block to obtain primary rate modeling data (PMRD) that characterizes a rate estimation function $R_k(q)$ for the coding mode $M_k$. The processing of each quantized version gives an estimate (or a measured value) of the rate $R_k(q_v)$ for a corresponding value $q_v$ of the quantization step size. The set of one or more ordered pairs $\{(q_v, R_k(q_v))\}$ corresponding to the one or more values of quantization step size may be interpreted as being a characterization of the rate estimation function $R_k(q)$.

As noted the above, the video encoder 700 may also include transmission circuitry 720. The transmission circuitry may be configured to transmit the side information stream 730 onto a communication medium (e.g., the Internet or a wireless network). The side information stream may include the primary rate modeling data (PRMD) for each coding mode and for each block.

In some embodiments, the plurality of coding modes may include an intra block coding mode and an inter block coding mode. In other embodiments, the plurality of coding modes may include various prediction sub-block partitions.

In some embodiments, the one or more values of the quantization step size q used above in step (C) include a minimum value $q_{min}$ that represents the quantization step size equal to one. In these embodiments, the above-described action of processing the collection of data may include determining the maximum value $q_{max}$ of the quantization step size (corresponding to a rate value of zero, e.g. all quantized coefficients are zero), based on the coefficient of maximum absolute value in the quantized version that corresponds to the quantization step size equal to one. (Recall that each of the quantized versions is an array of quantized transform coefficients.) The collection of data used to generate the primary rate modeling data may include the maximum value $q_{max}$.

Alternatively, $q_{max}$ may be computed more directly from the transform block instead of from the minimally quantized version of the transform block. (In some video encoding standards, the quantization of the transform block with quantization step size equal to one constitutes an identity mapping, i.e., causing no change in the respective coefficients of the transform block. Consequently, the computation of $q_{max}$ may just as well rely on the un-quantized transform block.) Thus, the operations performed per block by the digital circuitry may also include: for each coding mode $M_k$, computing the maximum value $q_{max}$ of quantization step size (corresponding to a rate value of zero) based on the transform block for that coding mode, i.e., based on the coefficient of the transformed block having maximum absolute value. In this alternative embodiment, the collection of data used to generate the primary rate modeling data also includes the maximum value $q_{max}$.

In some embodiments, the one or more values of quantization step size may include a minimum value $q_{min}$ that represents the quantization step size equal to one. Furthermore, the action of processing the collection of data may include computing a maximum rate value $R_{max}$ associated with the minimum value $q_{min}$ of quantization step size, based on the quantized version that corresponds to the minimum value $q_{min}$. Alternatively, the maximum rate value $R_{max}$ may be determined more directly from the transform block instead of from the minimally-quantized version of the transform block. In this alternative embodiment, the operations performed per block by the digital circuitry may also include computing a maximum rate value $R_{max}$ associated with the minimum value $q_{min}$ of quantization step size based on the transform block for that coding mode. In these embodiments, the collection of data used to generate the primary modeling data includes the maximum rate value $R_{max}$.

In some embodiments, the one or more values of quantization step size may include a middle value $q_{mid}$ strictly between a standard-defined minimum value (e.g., the value one) and a maximum value. For example, $q_{mid}$ may be the midpoint between the minimum value $q_{min}$ that represents the quantization step size equal to one and the maximum value $q_{max}$. Alternatively, the value $q_{mid}$ may be selected based on any optimization approach used by the mezzanine encoder, such as rate-distortion optimization (RDO). Furthermore, the action of processing the collection of data may include computing a middle rate value $R_{mid}$ associated with the middle value $q_{mid}$ of quantization step size, based on the quantized version that corresponds to the middle value $q_{mid}$. In these embodiments, the collection of data used to generate the primary modeling data includes the middle rate value $R_{mid}$.

In some embodiments, the computing of rate value R associated with any value q of quantization step size may consist of a simple approximation to emulate the code sizes of the quantized coefficients. For example, R is the sum of terms $1+2*\log_2[\text{abs}(\text{coeff})]$ for every non-zero coefficient coeff in the quantized version.

In some embodiments, the computing of rate value R associated with any value q of quantization step may be the result of the complete entropy encoding of the quantized version, or from an exact or approximate emulation of the entropy encoding of the quantized version.

It should be understood that the computational complexity increases with the number of states of the quantization step size that are explored. However, the accuracy of the resulting rate estimation function may also increase with said number.

In some embodiments, the processing of the collection of data may also include computing fitting parameters for a continuous functional model using the one or more ordered pairs. The fitting parameters may also be interpreted as a characterization of the rate estimation function $R_k(q)$. The functional model may be one described in the literature such as any the following:

$R_k(q) = \alpha + \beta \log(1/q)$           [Lin, 1998];

$R_k(q) = \alpha + \beta/q^\gamma$           [Lin, 1998];

$R_k(q)$=an expression based on a Laplace distribution of transform residuals     [Li, 2009].

In these example continuous functional models, $\alpha$ and $\beta$ are the fitting parameters. The computing of fitting parameters may consist of using numerical methods to assign values to the fitting parameters to minimize the error between the continuous functional model and all the computed states of the quantization step size corresponding to a transform block, for example:

$(R_{max}, q_{min}=1)$, $(R_{mid}, q_{mid})$, $(R_{min}=0, q_{max})$.

As shown in FIG. 8, in some embodiments, the operations performed per block by the digital circuitry may also include: for each coding mode $M_k$, generating one or more reconstruction residuals based respectively on the one or more quantized versions of the transform block for that coding mode, and generating primary distortion modeling data (PDMD) that characterizes a distortion function $D_k(q)$ for the coding mode based on the one or more reconstruction residuals. (Each of the reconstruction residuals may be a difference between the input block and a respective reconstructed block derived from a respective one of the quantized versions of the transform block.) In these embodiments, the side information stream 730 may also include the primary distortion modeling data for each coding mode and each block.

In some embodiments, the computing of distortion value D associated with any value q of quantization step size may comprise the sum of square error (SSE) of the reconstruction residual derived from the respective one of the quantized versions of the transform block.

In some embodiments, the processing of the collection of data may also include computing fitting parameters for a continuous functional model using the one or more ordered pairs. The fitting parameters may also be interpreted as a characterization of the distortion estimation function $D_k(q)$. The functional model may be one described in the literature, such as:

$D_k(q) = \alpha q^2$           [Sullivan, 1998].

In this example continuous functional model, $\alpha$ is the fitting parameter. The computing of fitting parameters may consist of using numerical methods to assign values to the fitting parameters to minimize the error between the continuous functional model and all the computed states of the quantization step size corresponding to a transform block, for example (D, q).

In some embodiments, the operations performed per block by the digital circuitry 710 may also include: (1) selecting the quantized version of the transform block that corresponds to an optimizing one of the coding modes and an optimizing value of the quantization step size q, where the optimizing value of the quantization step size and the optimizing coding mode have been selected based on any optimization approach used by the mezzanine encoder, such as rate-distortion optimization (RDO); and (2) encoding the quantized version corresponding to the optimizing coding mode and the optimizing value of quantization step size q to generate output bits that contribute to an encoded video stream. The transmission circuitry may be configured to transmit the encoded video stream onto the communication medium.

In some embodiments, the digital circuitry 710 may include transform circuitry and encoding circuitry. The transform circuitry may be configured to perform said receiving, said transforming, said quantizing for each coding mode $M_k$, said processing, and said selecting. The encoding circuitry may be configured to perform said encoding the quantized version corresponding to the optimizing coding mode and the optimizing value of quantization step size q. In one embodiment, the transform circuitry and the encoding circuitry are pipelined, with the encoding circuitry operating on an earlier picture of the picture sequence than the transform circuitry.

In some embodiments, the operations performed per block of the input video stream may include: (1) quantizing the transform block corresponding to an optimizing one of the coding modes using an optimizing value of the quantization step size q, wherein the optimizing value of the quantization step size and the optimizing coding mode have been selected any optimization approach used by the mezzanine encoder, such as rate-distortion optimization (RDO); and (2) encoding the quantized transform block corresponding to the optimizing coding mode and the optimizing value of quantization step size q to generate output bits that contribute to an encoded video stream. The quantization step in (1) may be separate from said quantization of the transform blocks using the one or more values of quantization step size, i.e., the quantization performed as part of the above-described step (C). The transmission circuitry is configured to transmit the encoded video stream onto the communication medium.

In one set of embodiments, a video encoder 900 may be configured as shown in FIG. 9. The video encoder may include digital circuitry 910 and transmission circuitry 920. (Furthermore, video encoder 900 may include any subset of the features, elements and embodiments described above in connection with FIGS. 1-8 and 10-17.)

The digital circuitry 910 may be configured to perform, for each of a plurality of blocks of the input video stream, operations including: (A) transforming a plurality of prediction residuals that correspond respectively to one or more coding modes in order to obtain one or more respective transform blocks for the one or more respective coding modes; and for each coding mode $M_k$, processing the respective prediction residual and/or the respective transform block for the coding mode $M_k$ to obtain rate modeling data (RMD) 915 for the coding mode $M_k$. The digital circuitry 910 may be realized in hardware as variously described above in connection with digital circuitry 710.

The transmission circuitry 920 may be configured to transmit a side information stream 930 onto a communication medium, wherein the side information stream includes the rate modeling data for each coding mode and for each block.

In some embodiments, the rate modeling data may include data characterizing a rate estimation function $R_k(q)$ for at least one of the one or more coding modes, wherein q represents quantization step size.

In some embodiments, the operations performed per block by the digital circuitry also include: for each coding mode $M_k$, generating one or more reconstruction residuals based respectively on one or more quantized versions of the transform block for that coding mode, and generating distortion modeling data for the coding mode based on the one or more reconstruction residuals, wherein the side information stream also includes the distortion modeling data for each coding mode and each block.

In some embodiments, the distortion modeling data includes data characterizing a distortion estimation function $D_k(q)$ for at least one of the one or more coding modes, wherein q represents quantization step size.

In some embodiments, the digital circuitry may be further configured to generate an encoded video stream that represents an encoded version of the input video stream, wherein the transmission circuitry is configured to transmit the encoded video stream onto the communication medium.

In some embodiments, the action of generating the encoded video stream includes operating on at least one of the one or more transform blocks.

In one set of embodiments, a video encoder may include digital circuitry and transmission circuitry as follows. The digital circuitry may be configured to encode an input video stream to obtain an encoded video stream, wherein said encoding includes generating a side information stream that characterizes properties of the input video stream. The transmission circuitry may be configured to transmit the encoded video stream and the side information stream.

In some embodiments, the side information stream includes data characterizing rate and/or distortion properties of the input video stream.

In some embodiments, the side information stream includes a stream of candidate motion vectors.

Video Transcoding System

Figure 10:
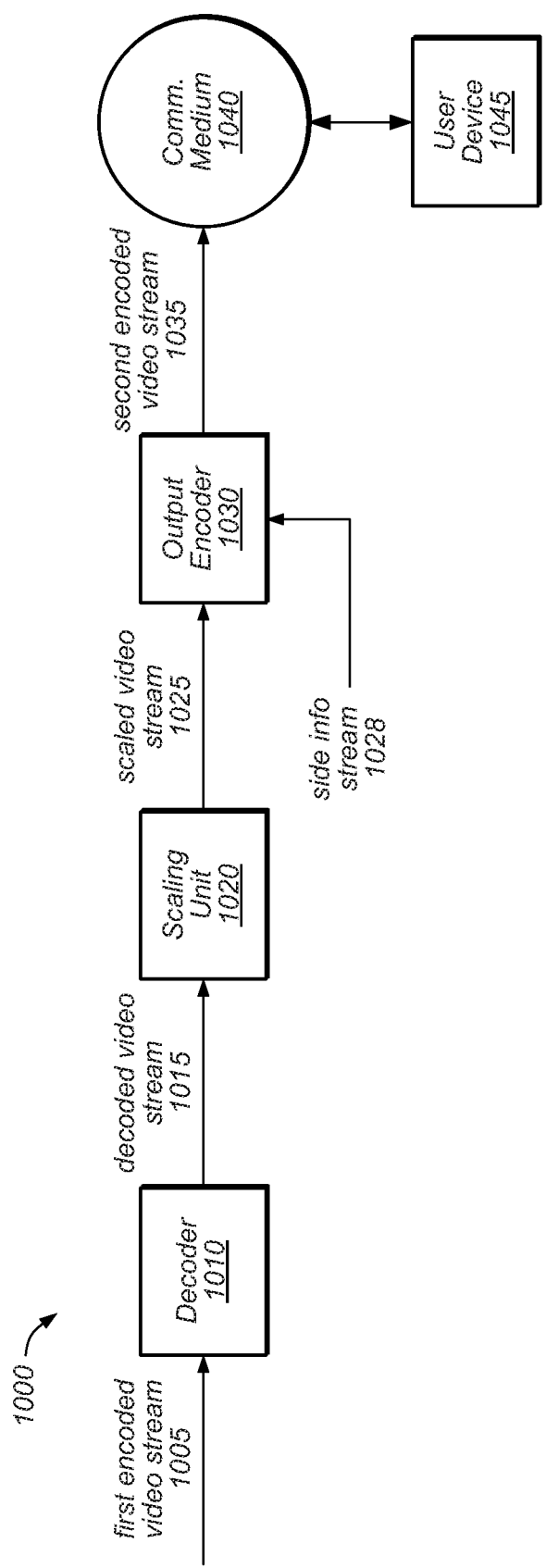
FIG. 10 illustrates one embodiment of a video transcoder system 1000.

In one set of embodiments, a video transcoding system 1000 may be configured as shown in FIG. 10. (Furthermore, video transcoding system 1000 may include any subset of the features, elements and embodiments described above and below in connection with FIGS. 1-9 and 11-17.)

The video transcoding system may receive a first encoded video stream 1005, and generate a second encoded video stream 1035 that is customized (e.g., in terms of one or more factors such as picture size, video format and bitrate) for a user device 1045 being currently served. A single stored copy of the first encoded video stream 1005 may be transcoded in different ways for different user devices. For example, the first encoded video stream 1005 may be transcoded to a low bitrate and small picture size for a mobile device connected via a wireless network, and to a high bitrate and large picture size for a home theater connected via a wired network. Furthermore, the video transcoding system 1000 may dynamically adjust the output bitrate of the second encoded video stream according to the conditions of the channel between the video transcoding system and the user device, e.g., based on feedback received from the user device. The second encoded video stream is transmitted to the user device through a communication medium 1040 (e.g., a wireless network, or a wired network, or a combination of wireless and wired networks). The video transcoding system 1000 may be situated at or near the edge of a network, e.g., as described above in connection with network edge transcoder.

The video transcoding system 1000 may be used in a wide variety of contexts and applications. For example, the video transcoding system 1000 may be coupled to a wireless access point (e.g., basestation) of a wireless network. Thus, the communication medium 1040 may be an air interface between the access point and the user device. In this context, the ability to customize and apply dynamic bitrate control to the second encoded video stream 1035 is especially useful because of the limited bandwidth available for the air interface and the highly dynamic nature of the channel.

In one application, the video transcoding system 1000 may be used by the operator of a content delivery network (CDN), and may be situated at or near the edge of the CDN. Thus, the output provided by the video transcoding system 1000 may be transmitted to a user device through a communication medium 1040 that is outside the control of the CDN operator. The video transcoding system 1000 may be used as the network edge transcoder of system 520. (See FIGS. 5 and 6.)

The video transcoding system 1000 may include a decoder 1010, a scaling unit 1020 and an output encoder 1030. The decoder 1010 may be configured to receive and decode a first encoded video stream 1005 to obtain a decoded video stream 1015.

The scaling unit 1020 may be configured to scale the decoded video stream to a target picture resolution in order to obtain a scaled video stream 1025. The target picture resolution may be lower than, the same, or even higher than the picture resolution implicit in the first encoded video stream 1005. The target picture resolution is programmable. Thus, different target picture resolutions may be used when serving different user devices.

The output encoder 1030 may be configured to receive a side information stream 1028 (e.g., as variously described above) associated with the first encoded video stream, and encode the scaled video stream using the side information stream 1028 in order to obtain the second encoded video stream 1035.

The first encoded video stream 1005 may be interpreted as an encoded version of a source video stream. (In some embodiments, the first encoded video stream is the stream produced by the mezzanine encoder 510, the video encoder 700, or the video encoder 900.) The side information stream 1028 may include metadata that characterizes properties of the source video stream. For example, the side information stream may include information characterizing rate and/or distortion properties of blocks in the source video stream. As another example, the side information may include motion vectors for blocks in the source video stream. The side information stream may be used by the output encoder 1030 to make optimal (or near optimal) coding decisions in a computationally efficient manner, e.g., decisions on which coding mode to use for a given block, or what value of quantization step size to use for a given block, or which one or more motion vectors are likely to give optimal inter predictions for a given block, etc.

In some embodiments, the side information stream may include N rate information streams corresponding to N respective coding modes, wherein N is greater than or equal to one. Each rate information stream $RIS_k$ of the N rate information streams characterizes a corresponding rate estimation function $R_k(q)$ per block of the first encoded video stream assuming block prediction based on the respective coding mode, where the variable q represents quantization step size.

In some embodiments, the value of N may vary from one picture to the next. For example, N may equal two for a given coded picture (such as a P picture or a B picture) of the first encoded video stream, in which case the rate information stream $RIS_1$ may correspond to an intra coding mode, and the rate information stream $RIS_2$ may correspond to an inter coding mode. Alternatively, the value of N may be interpreted as being fixed, but for some pictures, one or more of the N rate information streams may be quiescent. For example, in the N=2 case, an intra picture may not need the rate information stream for the inter coding mode, while a P picture or B picture may use both the intra rate information stream and the inter rate information stream.

In some embodiments, each rate information stream $RIS_k$ characterizes the rate estimation function $R_k(q)$ for each block with a corresponding set of two more fitting parameters associated with a continuous functional model. The continuous functional model may have any of a variety of forms. In one implementation, the continuous functional model has the form:

$$R_k(q) = \alpha + \beta \log(1/q) \qquad \text{[Lin, 1998]}$$

where $\alpha$ and $\beta$ are the fitting parameters.

In some embodiments, the side information stream also includes N distortion information streams, where each distortion information stream $DIS_k$ of the N distortion information streams characterizes a corresponding distortion function $D_k(q)$ per block of the first encoded video stream, assuming block prediction based on the respective coding mode. Each distortion information stream $DIS_k$ may characterize the distortion function $D_k(q)$ for each block with a corresponding set of one or more fitting parameters associated with a continuous functional model. The continuous functional model may have any of a wide variety of forms. For example, in one implementation, the continuation function model has the form:

$$D_k(q) = \alpha q^2 \qquad \text{[Sullivan, 1998]}$$

where $\alpha$ is a fitting parameter.

In some embodiments, the side information stream is used as input to the rate control process of the output encoder 1030. A typical rate control algorithm may be based on an aggregate function $R_A(q)$ for a picture and an aggregate distortion function $D_A(q)$ for the picture. The side information stream may contain the information needed to compute $R_A(q)$ and $D_A(q)$ for a given target picture resolution of the scaled video stream. The rate control algorithm may comprise controlling a scalar value $\lambda$ to achieve a target bit rate and to avoid overflow or underflow of a coded picture buffer at a remote decoder that receives the second encoded video stream.

In some embodiments, N=2 for a given coded picture of the first encoded video stream, in which case the distortion information stream $DIS_1$ may correspond to an intra coding mode, and the distortion information stream $DIS_2$ may correspond to an inter coding mode.

In some embodiments, the output encoder 1030 may be configured to process the side information stream in order to obtain an aggregate rate estimation function $R_A(q)$ for each frame of the scaled video stream, where q represents quantization step size. The aggregate rate estimation function $R_A(q)$ may be used in the selection of block coding mode and/or quantizer.

In some embodiments, the output encoder 1030 may be configured to further process the side information stream in order to obtain an aggregate distortion estimation function $D_A(q)$ for each frame of the scaled video stream. The aggregate rate estimation function $R_A(q)$ may be used in the selection of block coding mode and/or quantizer.

In some embodiments, the output encoder may be configured to further process the side information stream in order to obtain both an aggregate rate estimation function $R_A(q)$ and an aggregate distortion estimation function $D_A(q)$ for each frame of the scaled video stream.

In some embodiments, the output encoder 1030 may be configured to: (a) compute an aggregate rate function $R_A(q)$ for a picture based on the N rate information streams; (b) compute an aggregate distortion function $D_A(q)$ for the picture based on the N distortion information streams; (c) compute an aggregate scale function $\lambda(q)$ for the picture based on the aggregate rate function $R_A(q)$ and the aggregate distortion function $D_A(q)$, wherein said encoding the scaled video stream includes encoding the picture using Lagrange optimization based on a rate distortion cost function parameterized by scalar value $\lambda$; and (d) control the scalar value $\lambda$ using the aggregate rate function $R_A(q)$, the aggregate distortion function $D_A(q)$, and the aggregate scale function $\lambda(q)$.

Figure 11:
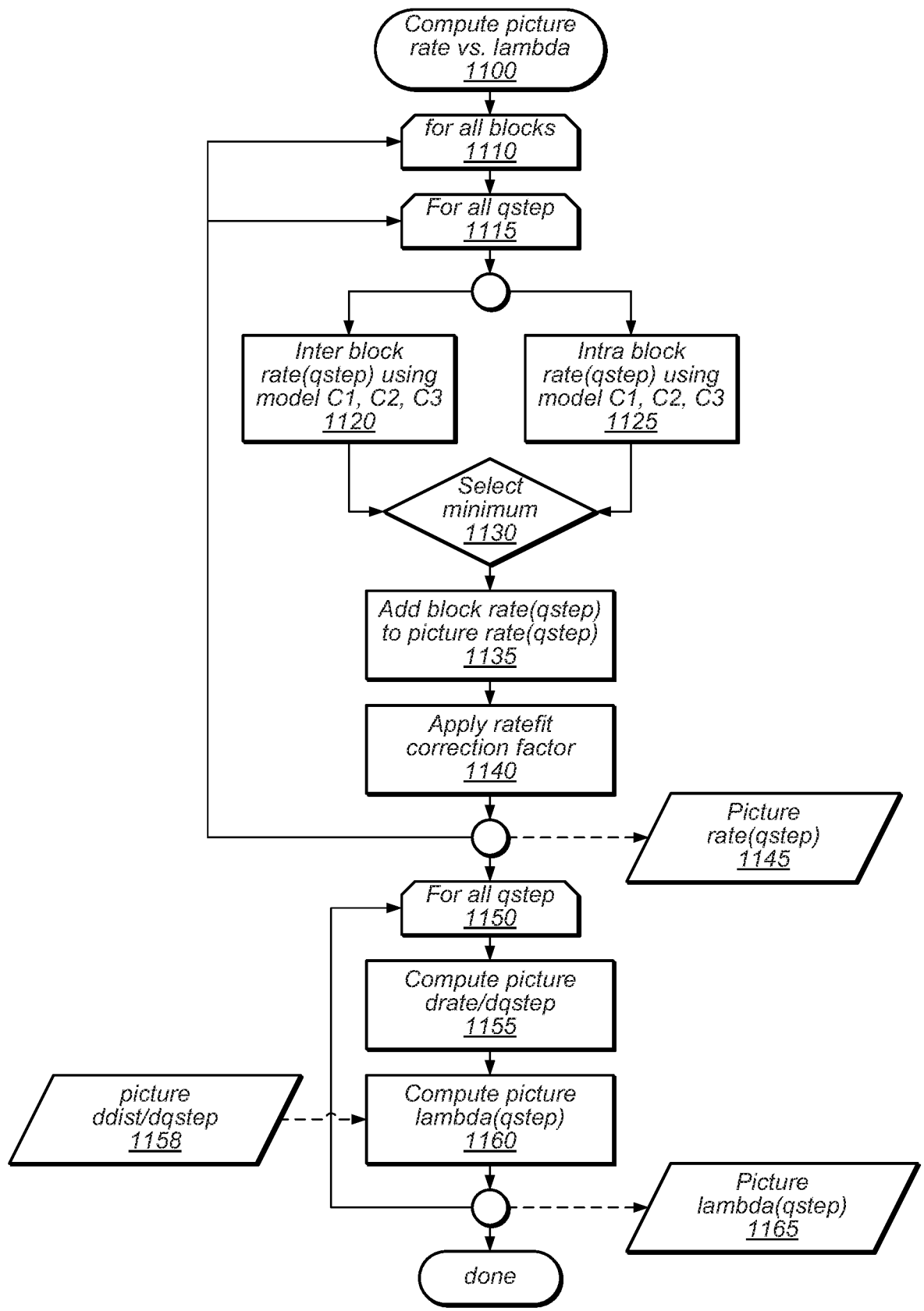
FIG. 11 illustrates one embodiment of a method 1100 for computing a rate vs. λ function at the level of a picture.

A process used by some embodiments to compute the aggregate rate function $R_A(q)$ and the aggregate scale function $\lambda(q)$ is shown in FIG. 11. Process 1100 tallies the contributions of all the blocks in the picture, resulting in an aggregate rate function $R_A(q)$ 1145 for the picture, i.e., resulting in data that characterizes rate as a function of quantization step size for the picture. The tallying over blocks is suggested by the loop construct 1110. For each value of quantizer step size q, the picture process may: (1) compute a block-related value of inter rate corresponding to the quantizer step size q by evaluating the functional model using the inter rate estimation function $R_k(q)$, as indicated at 1120; (2) compute a block-related value of intra rate corresponding to the qstep value by evaluating the functional model using the intra rate estimation function $R_k(q)$, as indicated at 1125; (3) select the block coding mode (inter or intra) that has the lower value of rate, as indicated at 1130; (4) accumulate that lower rate value for the block into the picture-related rate function $R_A(q)$, as indicated at 1135; and (4) apply a correction factor (referred to as ratefit) to the picture-related value $R_A(q)$ to improve the accuracy of the estimation, as indicated at 1140. The iteration over quantizer step size is indicated by the loop construct 1115. While FIG. 11 shows the loop on quantizer step size being inside the loop over blocks, in alternative embodiments, the nesting may be reversed, i.e., the loop over blocks may be the inner loop. Also, it should be understood that iterations over either or both of the loops may be parallelized.

In some embodiments, a correction 1140 may be applied, e.g., based on the expression:

$$R_A(q) \leftarrow \text{ratefit} * R_A(q),$$

where ratefit is a value computed by comparing predicted size and actual size from previous pictures in the video sequence.

After computing the picture-related function $R_A(q)$ over a range of quantizer step size q, a picture-related lambda function λ(q) is computed, as indicated by the loop 1150 over quantizer step size q. The picture-related lambda function λ(q) may be used, e.g., by the rate control algorithm.

At 1155, numerical techniques are used to compute a value of the picture-related rate derivative function $dR_A(q)/dq$ over the range of quantizer step size. The notation $dR_A(q)/dq$ represents the derivative of rate with respect to quantizer step size.

At 1160, a value of the picture-related lambda function λ(q) may be computed for the current value of qstep, according the formula:

$$\lambda(q) = -(dD_A(q)/dq)/(dR_A(q)/dq),$$

where $dD_A(q)/dq$ is a picture-related distortion derivative function.

In some embodiments, the derivative function $dD_A(q)/dq$, or one or more parameters characterizing that function, may be supplied as a input to the process 1100. For example:

$$dD_A(q)/dq = \text{constant},$$

where the value of the constant may be determined, e.g., empirically by offline analysis of a set of example video clips.

In other embodiments, the aggregate distortion function $D_A(q)$ and its derivative may be computed by adding the contributions from the distortion estimation functions $D_k(q)$ for every block in a similar manner to process 1100.

In some embodiments, the aggregate rate function $R_A(q)$, the aggregate distortion function $D_A(q)$, and the aggregate scale function λ(q) may be computed and stored as lists of values over a set of discrete quantizer step size values, rather than as closed form equations. Even so, each of the functions may be considered to be a continuous mapping, with intermediate values computed by interpolation. Furthermore, each of the functions is understood to be a one-to-one (i.e. invertible) mapping due to the fact that the underlying rate and distortion estimation functions per block are monotonic.

In the process 1100 to compute the aggregate rate function $R_A(q)$, the contribution of rate for each block in the output resolution may be from a mapped rate estimation function $R'_k(q)$ when the output resolution is different from the input resolution due to the operation of the scaler unit 1020. The mapped rate estimation function $R'_k(q)$ for a given block in the output resolution equals the rate estimation functions $R_k(q)$ of the one or more blocks at the corresponding scaled position in the first encoded video stream 1005.

If the side information stream includes distortion modeling information, it is also tallied as mapped distortion estimation functions in the same manner as the mapped rate estimation functions.

In some embodiments of the transcoding system 1000, the side information stream may include one or more candidate motion vectors for each block of the first encoded video stream, where the output encoder is configured to perform a fine-resolution motion vector refinement for each block that is restricted to one or more neighborhoods in motion vector space based on the one or more candidate motion vectors. The candidate motion vectors may be scaled if the target picture resolution is not the same as the picture resolution implicit in the first encoded video stream.

In some embodiments, the decoder 1010 may be configured to recover a motion vector for each block from the first encoded video stream 1005 as part of said decoding the first encoded video stream. In these embodiments, the output encoder may be configured to perform a motion vector refinement for each block that is restricted to a neighborhood in motion vector space based on the motion vector for the block. The candidate motion vector may be scaled if the target picture resolution is not the same as the picture resolution implicit in the first encoded video stream.

The output encoder 1030 may be configured to encode a block of the scaled video stream by minimizing a rate distortion function J over a space of encoding choices, where the rate distortion function J is parameterized by scalar value λ according to the relation $J=R(c)+\lambda D(c)$, where vector c represents a given realization of the encoding choices, where the rate function R(c) is an estimate (or measurement) of a number of bits that would be generated by encoding the block under the realization c, where the distortion function D(c) is an estimate (or measurement) of the block distortion that would be generated by encoding the block under the realization c. The encoding choices may include a choice of quantization step size q. If N is greater than one, the encoding choices may also include a selection of coding mode from among the N coding modes.

In some embodiments, the side information includes one or more candidate motion vectors per block (e.g., for P pictures or B pictures). In these embodiments, the encoding choices may also include a selection of a motion vector from a set of vectors including the one or more candidate motion vectors. The set of vectors may also include a decoded motion vector recovered from the first encoded video stream as part of said decoding the first encoded video stream.

In some embodiments, the output encoder 1030 may be configured to: (a) compute an aggregate rate function $R_A(q)$ for a picture based on the N rate information streams; (b) compute an aggregate scale function λ(q) for the picture based on the aggregate rate function $R_A(q)$ and an aggregate distortion function $D_A(q)$. In these embodiments, the action of encoding the scaled video stream may include encoding the picture using Lagrange optimization based on a rate distortion function parameterized by the scalar value λ. Furthermore, the output encoder may control the scalar value λ using the aggregate rate function $R_A(q)$, the aggregate distortion function $D_A(q)$, and/or the aggregate scale function λ(q) in order to avoid overflow or underflow of a coded picture buffer at a remote decoder that receives the second encoded video stream.

In some embodiments, the output encoder 1030 may be configured to: (1) encode the scaled video stream based on Lagrange optimization using a rate distortion function parameterized by scalar value λ; and (2) dynamically adjust the scalar value λ based on the side information stream in order to prevent overflow and underflow of a coded picture buffer of a remote decoder that receives the second encoded video stream (i.e. in order to perform rate control).

In some embodiments, the algorithm for adjusting the scalar value λ may be any of a number of rate distortion optimization-based rate control approaches available in the literature including [Lin 1995], [Weigand 1996], [Lin 1998], or [Choi 1994]. All of these describe a control method based the aggregate rate function $R_A(q)$ and aggregate distortion function $D_A(q)$, or based on other functions that can be computed from them such as $D_A(R_A)$. All of these describe a control method that dynamically adjusts the scalar value λ to accomplish rate control.

In some embodiments, the rate control algorithm described in the literature results in a uniform value for the quantization step size q to apply to every block in the picture. In other embodiments, such as one described in [Choi 1994], the block level rate and distortion estimation functions $R_k(q)$ and $D_k(q)$ as may be found in the side information stream may be used to accomplish adaptive quantization leading to the optimal set of quantization scale factors q for all the blocks of the output picture resulting in minimum distortion within the constraint of a target bit rate.

In some embodiments, the video transcoding system 1000 may also include transmission circuitry configured to transmit the second encoded video stream to a remote video decoder (e.g., associated with a user device) through the communication medium 1040. For example, the transmission circuitry may include a wireless transmitter (or transceiver) configured to transmit signals through space. The wireless transmitter may be part of a basestation in a wireless communication network. As another embodiment, the transmission circuitry may be a network interface for transmitting data into an IP network such as the Internet.

In some embodiments, the output encoder 1030 may be configured to receive auxiliary information and inject the auxiliary information into the scaled video stream. The auxiliary information may include one or more of the following: branding information of a business entity; advertising information; digital rights management (DRM) information; digital information providing watermark functionality; and customized features requested by a content provider, content delivery service provider, customer or user.

In some embodiments, at least one of the decoder 1010, the scaling unit 1020 and the output encoder 1030 is implemented using software configured for execution on an array of parallel processors. For example, the array of parallel processors may be two-dimensional array of parallel processors.

In some embodiments, the decoder, the scaling unit, the output encoder are implemented on distinct subsets of processors in an array of parallel processors.

Rate Control for Video Compression

The present patent discloses among other things a bit rate control method for a video compression encoder. The bit rate control method may be applied, e.g., to any video compression method that includes a hybrid encoder. (Hybrid encoders use motion compensation and have the property that bit allocation varies greatly from picture to picture.) The bit rate control method is described as being applied to the H.264 encoding standard, for which an optimal solution is desired for a great number of interdependent encoding choices. However, other standards may be used as desired.

Additionally, it should be noted that the bit rate control method is applicable to any hardware and/or software implementation. In some embodiments, the bit rate control method may be compatible with highly parallel implementations, such as those for the HyperX processor (a product of Coherent Logix™), field programmable gate arrays (FPGAs) or application specific integrated circuits (ASICs), which generally have more constraints on data dependencies than serialized software implementations based on an imperative programming model. In other embodiments, the bit rate control method may be compatible with a serialized software implementation.

In some embodiments, the rate control method is applied in a conventional encoder that takes uncompressed video samples as input and produces a compressed video output bitstream. In other embodiments, the rate control method is applied in a network edge transcoder which converts a previously encoded video elementary stream to a new bitstream, e.g., at lower bit rate. In yet other embodiments, the rate control method is applicable in a split configuration, where the entire encoding process is divided into a first part that performs analysis and motion estimation to produce an intermediate stream of analytical data about the video content, and a second part that uses the intermediate stream as input and produces a compliant video elementary stream output.

The general goal of rate control in a video compression encoder is to make decisions on a number of encoding algorithm choices, all of which affect the bit rate and picture quality of the output bit stream. The encoding parameter with the greatest impact on quality and bit rate is the quantization parameter (QP), but a myriad of other choices are important such as motion vector selection, motion mode selection, intra mode selection and macroblock mode decision.

In some embodiments, the bit rate control method may utilize a global approach to guide all of the encoding decisions, resulting in the minimum distortion for a given target bit rate. The bit rate control mechanism may include many components that are distributed and integrated into all of the major pipeline stages of the encoder, from video input and analysis, through motion estimation, intra mode analysis, transform coding and entropy coding.

Rate Control System Components and Features

In one embodiment, a bit rate control system may involve a buffer model, rate-distortion optimization, a macroblock model, intra complexity analysis, motion analysis, picture type selection and a rate control mechanism.

Buffer Model—The encoder may maintain a model of the decoder's compressed picture buffer to ensure that the bit stream produced by the encoder will not underflow or overflow the compressed picture buffer on playback. In H.264 the buffer model is called the Hypothetical Reference Decoder (HRD), and in MPEG-2 it is called the Virtual Buffer Verifier (VBV). H.264 also includes an idealized encoder and transmission channel, called the Hypothetical Stream Scheduler (HSS). In some embodiments, the rate control system may implement a combined HRD/HSS model.

Rate-Distortion Optimization Basis—Rate-distortion optimization (RDO) may provide a unified mechanism for adapting all of the encoding decisions to the target bit rate. It is a particular application of a more general Lagrangian optimization technique for solving problems of optimal allocation of resources. The Lagrange multiplier $\lambda$, described below in more detail, may be the variable that is controlled by the rate control system. All of the encoding parameters and choices, such as QP and coding modes, and consequently, the bit rate of the encoder's output, may be dependent on the value of $\lambda$.

Macroblock Model—The macroblock model may serve as a simplified description of the macroblock for rate control purposes, e.g., in place of the original source image sample values or their corresponding transform coefficients. With a small number of fitting parameters for each coded macroblock, the rate control system may estimate or predict the number of bits that will result in the bitstream and the distortion for that macroblock, and what QP value should be used for a given value of $\lambda$. The fitting parameters may be determined from a number of data sources, including, for example, input sample analysis, results of motion estimation, and transform coefficients.

Intra Complexity Analysis—The input to the encoder may be analyzed to obtain a figure of merit representing the complexity of the video samples within the video frame. (Note that this analysis should not be confused with intra prediction mode analysis.) The result of intra complexity analysis may be provided as an input to the macroblock model.

Motion Analysis—A measure of how well the samples of a macroblock in the current picture can be predicted with motion compensation from a reference frame may be computed as part of the motion estimation process. This measure may provide a basis for selection of a probable macroblock mode (inter versus intra) and may be another input to the macroblock model. The probable macroblock mode may be set to intra for a poorly predicted macroblock, and to inter for a well predicted macroblock.

Picture Type Selection—The selection of picture type may include two mechanisms. A group of pictures (GOP) schedule may determine the preliminary picture type according to a user-specified cadence. The period between intra pictures is referred to as the key-frame interval and may have a value from 1 (implying that all frames are of intra type) to hundreds of frames. The period between P pictures may be determined when the user specifies how many consecutive B pictures are to be used, typically in the range of 0 to 3.

After the GOP schedule determines the preliminary picture type, scene change detection algorithms may force a scheduled B or P picture to be coded as intra. A rapid motion detection algorithm may cause a scheduled B picture to be coded as a P picture. Overriding the scheduled picture type may affect the GOP schedule for subsequent pictures.

Scene change and rapid motion detection algorithms may be based on motion analysis metrics. The motion analysis metrics may be computed as part of the motion estimation process.

Look Ahead Processing—Intra complexity analysis, motion analysis, and picture type selection can be performed many pictures in advance of the actual coding functions. The amount of look ahead that is useful is comparable to the number of compressed pictures that can stored in the decoder's coded picture buffer, up to 20 frames or more in some cases. The combined information for all of the frames within the sliding look ahead window may be used as part of the rate control mechanism.

Rate Control Mechanism—The rate control mechanism may be a discrete-time feedback control system. The rate control mechanism may attempt to maintain the value of λ as constant as possible. Projections of decoder buffer occupancy based on the current picture's complexity and that of other pictures in the look ahead window may cause the rate control mechanism to increase or decrease the value of lambda. Discrete-time system analysis techniques may thus be used in the design of the feedback control system to ensure stability.

Figure 12:
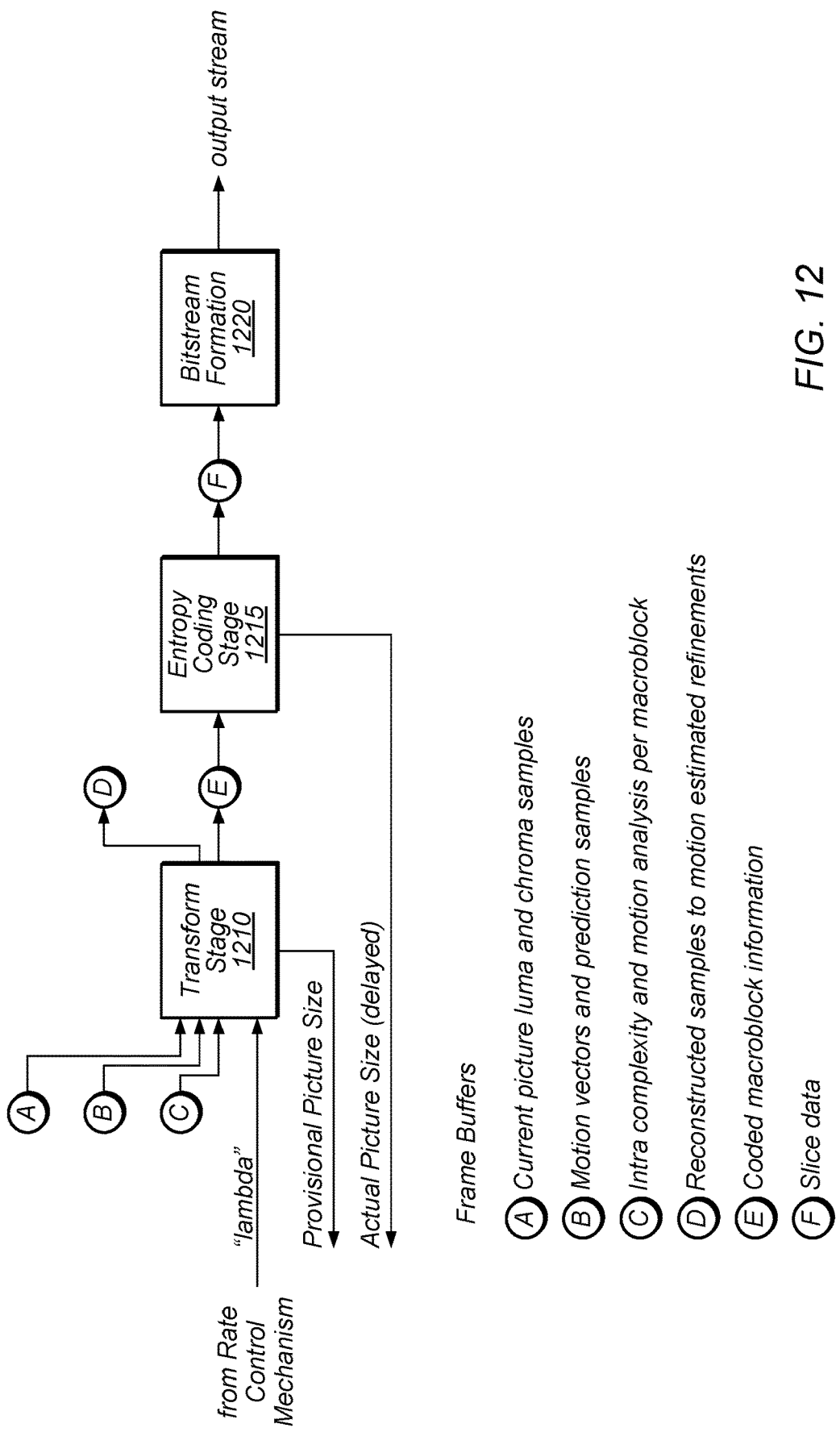
FIG. 12 illustrates the second half of an integrated encoder or network edge transcoder, according to one set of embodiments.
Figure 13:
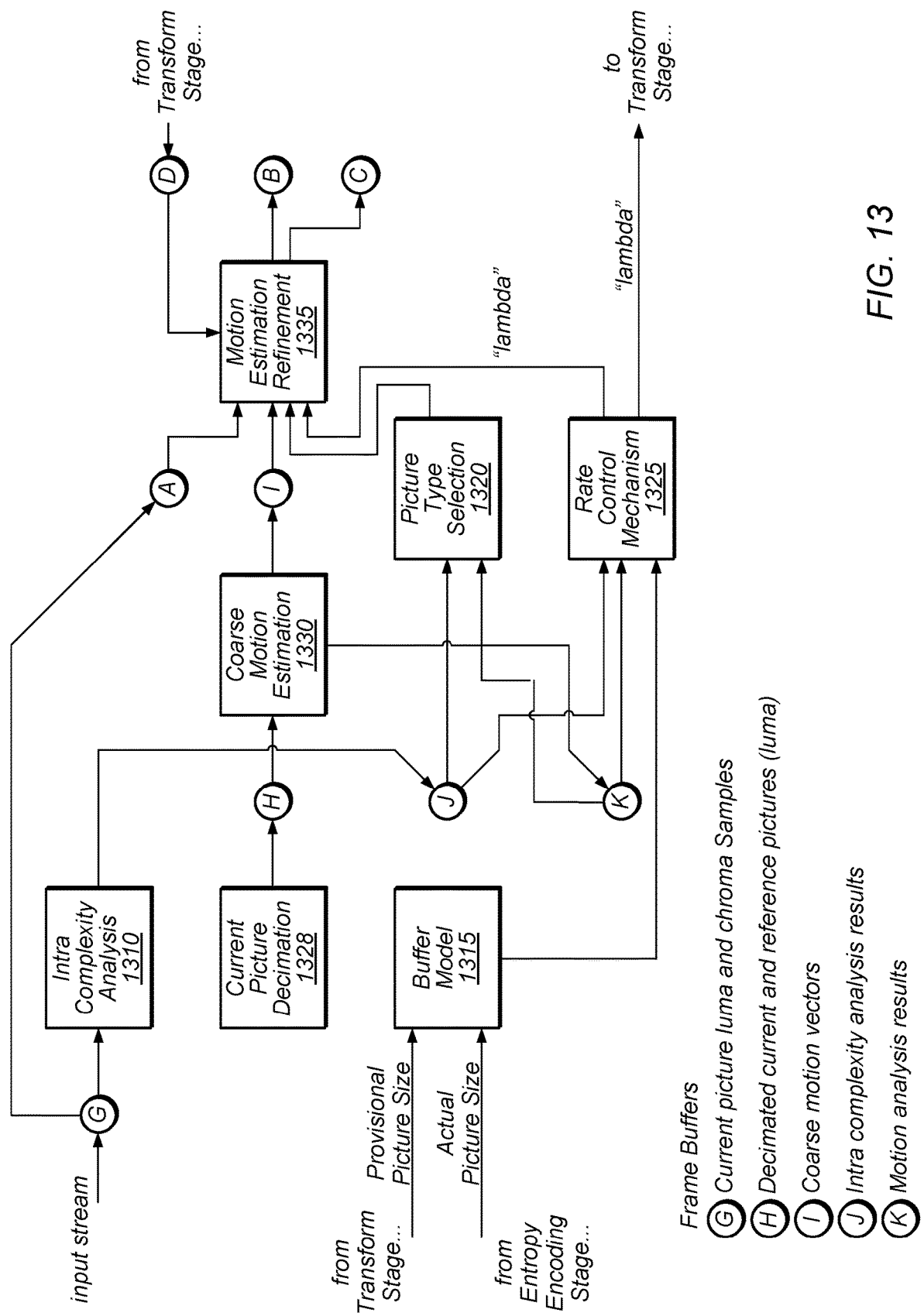
FIG. 13 illustrates one embodiment of the first half of a video encoder.

FIGS. 12 and 13—Block Diagram for Rate Control System

FIG. 12 illustrates the second half of an H.264 encoder or the second half of a network edge transcoder, according to one embodiment. This second half may include a transform stage 1210, an entropy coding stage 1215, and a bitstream formation stage 1220. The integrated rate control components may include the frame buffer A of intra complexity and motion analysis information, the input for the scalar value λ, the picture size outputs, and the implementation of the macroblock model for qstep selection (within the transform stage). The picture size outputs may include a provisional picture size (PPS) from the transform stage and an actual picture size (APS). The transmission of the actual picture size for a given picture may be delayed relative to the transmission of the provisional picture size for that picture, due to the pipelined nature of processing in the depicted embodiment.

FIG. 12 indicates the relative position and use of various frame buffers. The frame buffers may include: a buffer A for current picture luma (luminance) and chroma (color) samples; a buffer B for motion vectors and prediction samples; a buffer C for intra complexity and motion analysis samples per macroblock; a buffer D for reconstructed samples to motion estimation refinement; a buffer E for coded macroblock information; and a buffer F for slice data.

As indicated, in this embodiment, the transform stage 1210 receives as input data from buffer A (current picture luma and chroma samples), buffer B (motion vectors and prediction samples), buffer C (intra complexity and motion analysis per macroblock), and scalar value λ, and provides output to buffer D (reconstructed samples) and buffer E (coded macroblock information), as well as information regarding provisional picture size. In this embodiment, the entropy coding stage 1215 receives its input data from buffer E (coded macroblock information), and outputs slice data (to buffer F) and actual picture size. The bitstream formation stage 1220 receives the slice data from buffer F, and generates a corresponding portion of the output bitstream.

FIG. 13 illustrates one embodiment of the first half of the H.264 encoder. The rate control components may include intra complexity analysis 1310, the buffer model 1315, picture type selection 1320, and the rate control mechanism 1325. Within the coarse motion estimation stage 1330 there may be a motion analysis process. Intra complexity information and motion analysis information may be provided to the transform stage via buffer C, and picture size information may be received as feedback from the downstream stages. The picture size information may include a provisional picture size PPS from the transform stage and an actual picture size (APS)

In addition to the previously described buffers A, B, C and D, the subsystem of FIG. 13 may utilize buffers G, H, I, J and J. Buffer G is for current picture luma and chroma samples. Buffer H is for decimated current and reference pictures (luma). Buffer J is for intra complexity analysis results. Buffer K is for motion analysis results. Buffer I is for coarse motion vectors.

As FIG. 13 indicates, the intra complexity analysis process 1310 may receive its input data from buffer G (current picture luma and chroma samples) and provide output to buffer J (intra complexity analysis results). The current picture decimation process 1328 may provide output to buffer H (decimated current and reference pictures). The buffer model 1315 may receive the provisional picture size PPS and the actual picture size APS, and provide output to the rate control mechanism, as shown. The coarse motion estimation process 1330 may receive input from buffer H (decimated current and reference pictures), and provide outputs to buffer K (motion analysis results) and buffer I (coarse motion vectors). The picture type selection process 1320 may receive input from buffer J (intra complexity analysis results) and buffer K (motion analysis results), and provide output to the motion estimation refinement process 1335. The rate control mechanism 1325 may receive input from the buffer model, from buffer J (intra complexity analysis results), and from buffer K (motion analysis results), and provide a value of the Lagrange multiplier λ to the transform stage 1210 of FIG. 12 and to the motion estimation refinement process. Finally, the motion estimation refinement process 1335 may receive input from buffer A (current picture luma and chroma samples), from buffer I (coarse motion vectors), from the picture type selection process (picture type), the rate control mechanism (the value of λ), and buffer D (reconstructed samples to motion estimation refinement), and may provide output to buffer B (motion vectors and prediction samples) and buffer C (intra complexity and motion analysis per macroblock).

It should be noted that the particular configuration of elements shown in FIGS. 12 and 13 is meant only as an example of the inventive principles herein disclosed, and is not intended to limit implementations to any particular form, function or appearance.

System Component Details

The following provides further details regarding components or features of the rate control system, according to one set of embodiments.

Rate-Distortion Optimization Basis

For any given point in an N-dimensional space of possible encoding choices, it is possible to compute the following values:

R=rate=the number of bits in the bitstream resulting from the encoding choices;

D=distortion=the distortion caused by the lossy encoding algorithm according to the choices.

Distortion may be based on any of a number of distance criteria. The commonly used peak signal-to-noise ratio (PSNR) is based on the mean squared-error (MSE) between the block of input samples to the encoder and the block of reconstructed samples provided by the local decoder. Using MSE as the distortion measure may optimize the algorithm for improved PSNR.

Mean Absolute Difference (MAD), which is closely related to Sum of Absolute Differences (SAD), may also be used, as well as any distance criterion that results in a real value for distortion.

As noted above, rate-distortion optimization theory defines a cost function J as:

$$J=D+\lambda R.$$

Lagrangian Optimization is the technique of minimizing J for a given value of $\lambda$, where $\lambda$ is the Lagrangian multiplier, as noted above.

To select a particular encoding choice over another means picking the choice that minimizes J. Selection of the quantization parameter QP is one such choice that is made in an encoder. The continuous variable corresponding to QP is qstep. In some embodiments, qstep is related to QP by the expression:

$$qstep=A*2\textasciicircum(QP/6),$$

where A is a fixed constant, where "^" denotes exponentiation.

Figure 14:
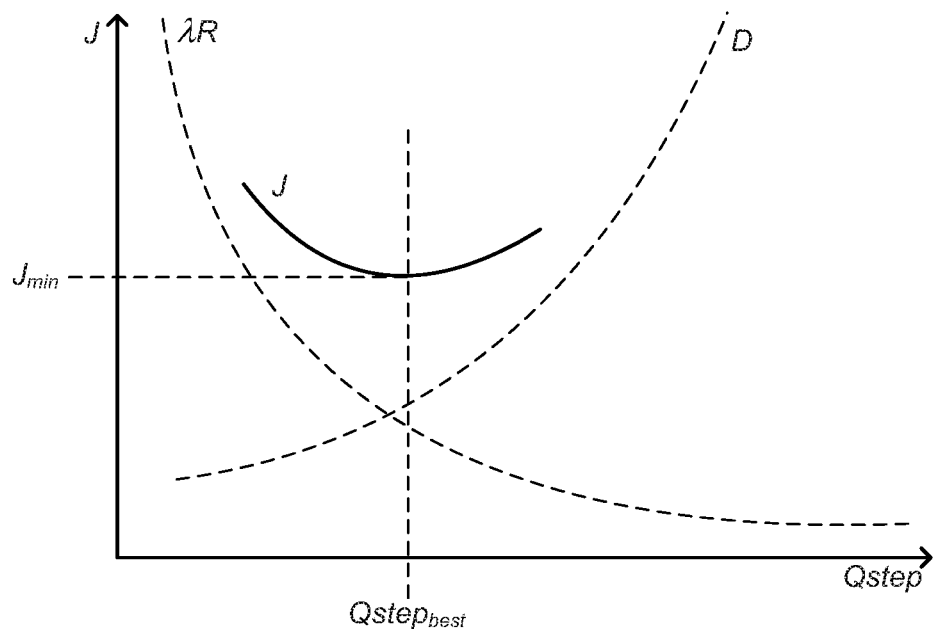
FIG. 14 illustrates an example of a cost function J=λR+D as a function quantization step size.

Assume the following: qstep is a continuous variable; R(qstep) is monotonically decreasing and its derivative is continuous; and D(qstep) is monotonically increasing and its derivative is continuous. It can be shown that both functions of qstep are concave up. Accordingly, the minimum value of the cost function J is achieved at some intermediate value of qstep, not at $qstep_{min}$ or $qstep_{max}$, as shown in FIG. 14. FIG. 14 depicts the cost J as a function of qstep, and indicates the optimum cost $J_{min}$ is achieved at $qstep=qstep_{best}$.

It is also possible to express distortion as a function of rate subject to the constraint of minimum cost J. It is provable that the shape of the function D(R) is concave up as suggested in FIG. 15. Each point on the graph of D(R) corresponds to a different value of qstep. Minimizing J means the derivative of J is zero, and thus $$dD/dR=-\lambda.$$

Figure 15:
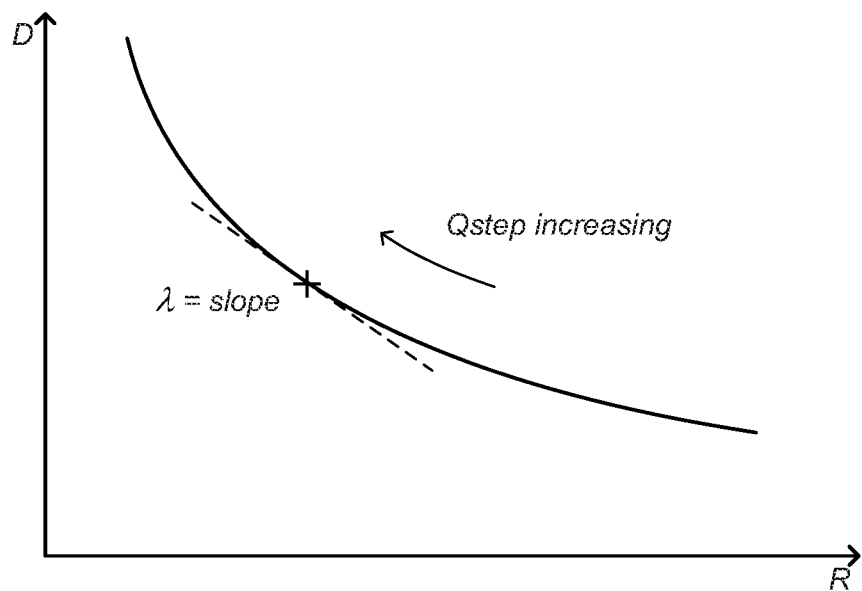
FIG. 15 illustrates an example of distortion as a function of rate.

Accordingly, $\lambda$ is the negative slope of the curve D(R), as indicated in FIG. 15, and there is a mapping between $\lambda$ and qstep.

If expressions for R(qstep) and D(qstep) are available, they can be used to compute $\lambda$ from qstep according to the expression:

$$\lambda(qstep)=-(dD/dqstep)/(dR/dqstep)$$

The inverse function qstep($\lambda$) is not likely to be a closed form expression. However, given a characterization of the forward function $\lambda$(qstep), it is easy to numerically approximate the value of the inverse function $\lambda$(qstep) at any given value of qstep.

The rate control system described herein may rely on these observations. In some embodiments, $\lambda$ is the value controlled by the rate control system, and qstep is a dependent variable, according to the above-described inverse function.

Conceptually, it is reasonable for rate control to be based on $\lambda$ because it means a consistent balance between rate and distortion is applied to all of the encoder's decisions, over the whole picture, and from one picture to the next. If the complexity of the images is variable this approach results in greater allocation of bits to the complex areas, as is desired.

The next section describes among other things a method for QP selection.

Application of the Macroblock Model for Qstep Selection

A value for qstep may be needed to quantize the coefficients that result from the discrete cosine transform (DCT) computation. A mapping function qstep(lambda) exists, but is specific to every coded block and to the coding mode (e.g., inter versus intra) of the macroblock.

In some embodiments, the information available after the transform computation may be used to implement a practical qstep(lambda) computation (e.g., computationally/economically feasible). The available information may include the result of the intra complexity analysis for the macroblock, the results of the motion analysis for the macroblock, and the list of transform coefficients. The transform coefficients may provide the most useful information. From these values it is possible to estimate R(qstep), since quantized coefficients are entropy coded via a fixed coding formula. The cost in bits for non-zero coefficients may be approximately equal or similar to $$1+2*\log(|coeff|).$$

Similarly, a reasonable estimate of D(qstep), i.e., distortion as a function of qstep, may be computed.

In one embodiment, an empirical approach may be used to find a practical (e.g., computationally or economically feasible) function to compute qstep based on these available data.

Thus, in one embodiment, a function may be used to compute qstep. In some embodiments, qstep may not be computed until after the DCT computation, so that the values of the coefficients may be used in the function (to compute qstep).

In some embodiments, qstep(lambda), i.e., qstep as a function of lambda, may be computed separately for each macroblock. For example, in one embodiment an encoder may be implemented that supports a feature called adaptive quantization, where QP is not constant over the picture. Ideally, a higher QP is used in complex regions of the picture to use fewer bits and because the human visual system is more tolerant of distortion in complex areas. A lower QP is used in flat regions of the picture where the eye is more sensitive to distortion, and the bit rate is low anyway due to lack of image detail. The computation of qstep(lambda) may have this behavior even when lambda is held constant over the entire picture.

Note that in contrast with the approach described herein, prior art techniques for adaptive quantization include complicated approaches that use QP as the independent variable, where QP is determined a priori without the detailed information inherently contained in the transform coefficients.

Motion Analysis, Picture Type Selection, and Look Ahead

In some embodiments, several components of the rate control system may be related to motion estimation.

Motion analysis is a measure of how well macroblocks from a current picture can be predicted from a reference picture. The motion estimation process (or module) determines the best motion vector for this prediction, and the motion vector and prediction are used to code the macroblock. The motion estimation process also computes how well the current macroblock is predicted, and this figure of merit or metric may thus be a potential predictor of the complexity of the inter coded macroblock.

The organization of the motion estimation function may be especially amenable to the integration of these functions. Motion estimation generally includes a coarse resolution part and a full resolution part.

In one embodiment, picture type selection, including scene change detection and rapid motion detection, may be based on motion analysis information output from a coarse motion estimation stage. Moreover, in further embodiments, part of the motion estimation process may be performed on input pictures far in advance of the current picture to effect a look-ahead function for rate control and picture type selection purposes.

Rate Control Benefit from Coarse Motion Estimation

In some embodiments, the coarse resolution motion estimation may be performed on decimated copies of the current and reference images. The coarse resolution motion estimation process (or module) may effectively support a full search algorithm over a very large search range, resulting in coarse motion vectors and a figure of merit or metric of the potential predictor. Two aspects of the coarse motion estimation process may be particularly significant: it may use source samples for the reference picture, not reconstructed samples, and it may complete its function (e.g., processing) over the whole frame before full resolution motion estimation begins.

These two facts mean that coarse motion estimation may be used to accomplish a look ahead function. The figure of merit of the prediction may thus be used to forecast the size of future pictures as needed for the rate control mechanism. In some embodiments, it may also be used for picture type selection. A large number of poor predictions generally means the current picture is in a different scene from the reference picture, and should be forced to intra (mode). A moderate number of poor predictions may indicate a scene of high motion where B pictures should be replaced with P pictures.

Thus, in some embodiments, rate control components may be integrated with the coarse motion estimation stage, as shown in FIG. 13, described above. In one embodiment, coarse motion estimation may not depend on reconstructed image samples, and so it can be pipelined and operate on future pictures. In a further embodiment, picture type selection may be based on prediction figure of merit computed in the coarse motion estimation. Moreover, in some embodiments, picture size forecast may be based on a prediction figure of merit computed in the coarse motion estimation. In further embodiments, the prediction figure of merit from full resolution motion estimation may be used as part of the macroblock model for qstep selection.

Buffer Model

As noted above, in some embodiments, the rate control system may include a model of the decoder's coded picture buffer (i.e., the buffer model) to ensure that the encoded bitstream will not overflow or underflow the buffer on playback. The buffer model may be used by the rate control mechanism to forecast future occupancy after the current and future pictures are encoded.

Thus, for example, for each output picture, the model may predict the initial arrival time of the first bit of the coded picture, and the final arrival time of the last bit to the decoder's coded picture buffer. The rate of transmission may be specified as the maximum bit rate, which may be the same as the target bit rate for constant bit rate (CBR) encoding and may be larger for variable bit rate (VBR) encoding.

Figure 16A:
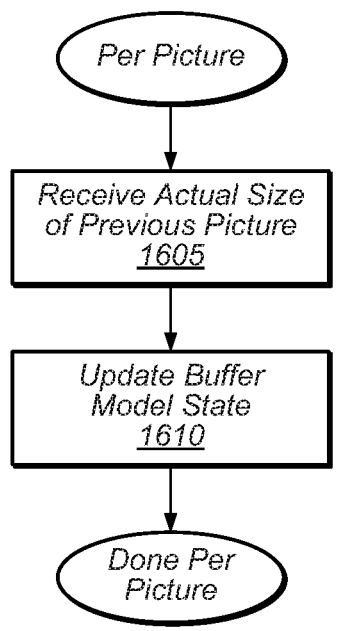
FIG. 16A illustrates an embodiment of a buffer model update process based on actual picture size.
Figure 16B:
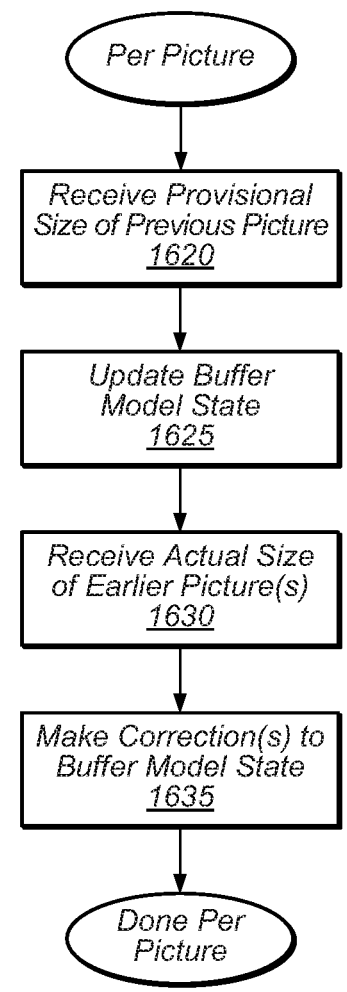
FIG. 16B illustrates an embodiment of a buffer model update process based on actual and provisional picture sizes.

FIGS. 16A and 16B respectively illustrate a buffer model update process in the ideal case, and in a case where the actual picture size is not immediately available.

In some embodiments, the operation of the buffer model may require updating of its internal state with the size of every coded picture before the rate control mechanism can be applied to the next picture. This feature is depicted in FIG. 16A, in which, for each picture in a video sequence, the actual size of the previous picture is received at 1605, and the buffer model state updated at 1610. However, note that the exact picture size may be computed in the entropy coding stage of the encoder (e.g. CABAC), and the size of the of the previous picture may not be immediately available due to the pipelined implementation of the encoder.

To resolve the data dependency timing problem, a provisional value for coded picture size may be used based on values of the quantized coefficients for every macroblock, along with a predicted bit cost of the motion vector and coding mode information. An adjustment factor may then be applied to account for the additional reduction effect of the entropy coding stage and this adjustment factor. One embodiment of the modified process is shown in FIG. 16B, in which, for each picture in the video sequence a provisional size of the previous picture is received at 1620, and the buffer model state updated accordingly at 1625, after which the actual size of one or more earlier pictures may be received at 1630. In response, correction(s) to the buffer model state may be made at 1635.

The buffer model computes the occupancy information needed for the rate control mechanism based on the provisional picture size value. When the exact picture size value is available at a later time, the buffer model is further adjusted for the difference between the provisional and actual picture size.

In some embodiments, the accuracy requirement for the buffer model may be extreme. For example, it may be required to ultimately account for every single output bit and accumulate zero error over an indefinitely long encoding period. The above described method of correcting an initial estimate, e.g., of picture size, with exact information obtained later may be sufficient to satisfy this requirement.

In another embodiment, the buffer state may include a state variable with the sum of all output bits in a bitstream. Long encoding sessions, such as for live events, may be supported, and so the sum may exceed the maximum value that can be stored in the relevant data type, e.g., in a 32 bit integer. The buffer model may accordingly include a mechanism to reinitialize the sum value on the fly, without a loss of accuracy, to keep the value within range, e.g., within the range of a 32 bit integer.

Thus, in some embodiments, a decoder buffer model may be updated for each picture using an initial estimate of a coded picture size, then further updated at a later time when the exact coded picture size is available. Moreover, in further embodiments, a mechanism may be provided to reinitialize the output bit sum value on the fly, without a loss of accuracy, to keep the value within range, e.g., within the range of a 32 bit integer.

Rate Control Mechanism

In some embodiments, the number of bits per picture in the output bitstream may be a consequence of the value of lambda which is chosen before most coding decisions are made for the picture. The lambda value may thus be adjusted during encoding because of the dynamic nature of a video sequence, with image complexity that varies within an image, between pictures, and from scene to scene.

In one embodiment, the inputs to the adjustment process may include:

1. The value of lambda before adjustment, and the history of lambda values.
2. Current decoder buffer occupancy provided by the buffer model.
3. Picture level intra complexity and motion analysis information, for the current and future pictures within the look ahead window.
4. Picture type selection.
5. Historical information on the coded size of pictures according to picture type.

These inputs may be used in a second order discrete-time feedback control system, resulting in an adjusted lambda value, along with a forecast of buffer occupancy that guarantees no overflow or underflow. Part of the control computation may include predicting future picture sizes based on these inputs. Note that the actual QP value may not be computed by this picture-level rate control mechanism in the adaptive quantization scenario described above.

The primary goal of the feedback control system may be to make the minimal adjustment to lambda needed to maintain buffer compliance, resulting in the most (or approximately optimal) consistent experience of perceptual quality for a given target bit rate. Thus, in some embodiments, various implementations and computations may be used to adjust lambda in accordance with input data, as described above.

More generally, in some embodiments, an input video stream may be received. A Lagrangian multiplier, lambda, may be computed for each of a plurality of pictures of the input video stream. The bit rate for an output video stream may be dynamically controlled based on the input video stream and lambda for each of the plurality of pictures. In one embodiment, one value for lambda may be used for all of the encoding decisions in each picture, then adjusted as required for rate control between pictures.

Network Edge Transcoder

The network edge transcoder concept is a version of an encoder with a reduced computation footprint. Its goal is to produce high quality compressed video output in real time with minimum power consumption and higher channel density than a stand-alone encoder. It generally accomplishes this by using a compressed video elementary stream as its input, already in the same resolution and frame rate as, but higher bit rate than, the target output. In some embodiments, this may allow the network edge transcoder to omit the coarse motion estimation stage.

Figure 17:
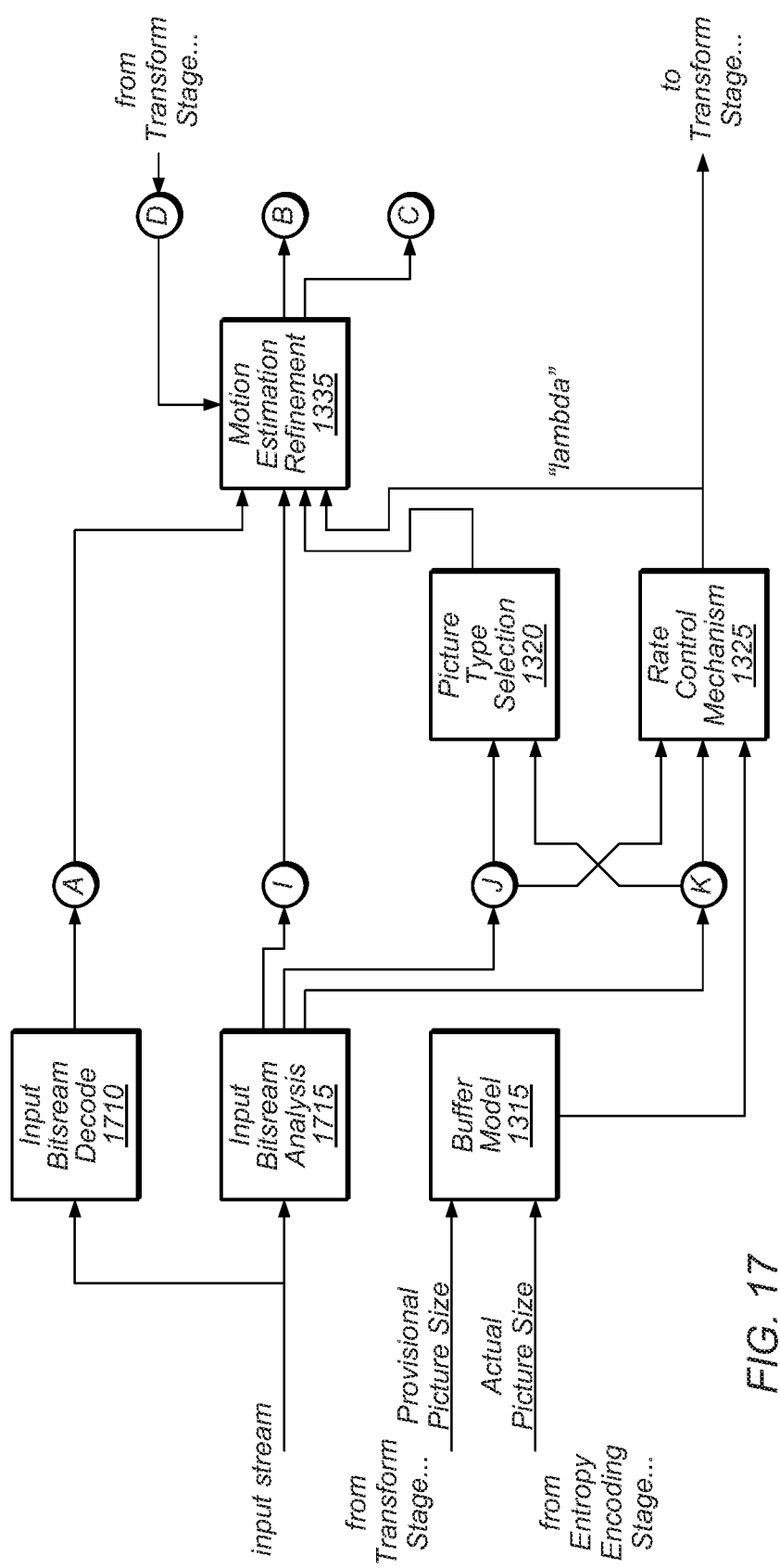
FIG. 17 illustrates the first half of a network edge transcoder according to one embodiment.

FIG. 17 illustrates an exemplary network edge transcoder (portion, e.g., the first half) in which the intra complexity analysis and motion analysis within coarse motion estimation are replaced by input bitstream analysis which data mines the decisions and results made by the previous encoding of the input bit stream. Note that the second half of the network edge transcode may be the same as a conventional compressed video encoder, as shown in FIG. 12, and thus is not presented again for brevity.

As FIG. 17 shows, an input bitstream decode process (or module) 1710 may receive an input bitstream as input, and may provide output to buffer A (current picture luma and chroma samples). As also shown, an input bitstream analysis process (or module) 1715 may also receive the input bitstream as input and provide output to buffer I (coarse motion vectors), to buffer J (intra complexity analysis results) and buffer K (motion analysis results). The picture type selection process (or module) may receive input from buffer J (intra complexity analysis results) and buffer K (motion analysis results), and may provide output (picture type) to the motion estimation refinement process (or module). The rate control mechanism may also receive input from buffer J (intra complexity analysis results) and buffer K (motion analysis results), as well as from the buffer model, and may provide output (lambda) to the motion estimation refinement process (or module) and the transform stage (e.g., of FIG. 19), as shown. Finally, the motion estimation refinement process may receive inputs from buffer A (current picture luma and chroma samples), from buffer I (coarse motion vectors), from buffer D (reconstructed samples to motion estimation refinement), from the picture type selection process (picture type), and from the rate control mechanism (lambda), and may provide output to buffer B (motion vectors and prediction samples), and buffer C (intra complexity and motion analysis per macroblock).

Note that in some embodiments, the network edge transcoder may implement the same (or similar) transform coding and rate control system as a stand-alone encoder, but may use the information from quantized coefficients contained in the input bit stream to obtain the motion analysis and intra complexity analysis needed for rate control. This may result in a more accurate assessment of rate and distortion for the value of QP used than can be obtained from a standalone encoder using the coarse motion estimation stage for the analysis. In some embodiments, this information may be used with additional intra complexity analysis and the list of coefficients to requantize each recoded macroblock according to the current value of lambda. The effect and output quality may be the same as (or similar to) a two pass encoder even though the computation footprint of the final real-time encoding step may be less than a stand-alone encoder.

Thus, in some embodiments, rate control components according to the techniques disclosed herein may be integrated into the network edge transcoder concept, as shown in FIG. 17.

More specifically, in some embodiments, on a network edge transcoder configuration, rate control may obtain high quality motion analysis and intra complexity analysis metrics from the quantized coefficients and other coding mode information contained in the input bitstream.

Split Encoder Configuration

In a further embodiment, the rate control algorithms or techniques described herein may also be applied in a split encoder configuration. In a split encoder configuration, much of the processing and analysis for encoding and rate control may be performed in a first part of the encoder. The results of the first part, including but not limited to, motion analysis, coarse motion vectors, and/or intra complexity analysis, may then be stored in an intermediate stream of analytical data about the content. The intermediate stream of data may include a compliant compressed video elementary stream plus additional analytical data, or may be a nonstandard data format containing all the information needed to complete the encoding of the video content. A second part of the encoder may then use the intermediate stream as input and complete the encoding process.

Similar to the network edge transcoder, a primary goal of the split encoder configuration may be to have the minimum possible computation, physical size, and power footprint for the second part of the encoding process. The second part may accordingly be optimized for use as a network edge device and may be deployed with greater channel density than an entire compressed video encoder. The second part of the encoder may also include stream specific processing such as a stream-specific bit rate or branding so that individual output streams may be personalized to one or more specific receivers.

In one embodiment, the above encoder partitioning may allow the first part of the encoding process to be performed once and the results stored. Subsequently, the second part of the encoding process may be performed many times as needed for many receivers, all using different encoding parameters or stream personalization. Any processing that is specific to an individual output stream or receiver may be limited to the second part of the encoding process.

Thus, in some embodiments, a split configuration for an encoder may be used with the goal of minimizing the computation, physical size, and/or power footprint for the second part of the encoder so that it is optimized for use as a network edge device. In various embodiments, the partitioning of the encoder between the first part and the second part may be made in any of a variety of ways. In other words, the relevant components, processes, or modules, may be distributed between the two partitions in any manner desired. Moreover, in one embodiment, the result of the first part of the encoding process may be stored in an intermediate stream format containing all the information needed by the second part to complete the encoding process in a subsequent operation. Additionally, in some embodiments, the encoder may be partitioned into two parts, where any processing that is specific to an individual output bitstream or receiver is performed in the second part.

The techniques and systems described in this specification may be employed in any of various types of products or applications, including cell phones, cordless phones, television, film presentation, computers, cable modems, cable set-top boxes, and others, as desired. Moreover, the techniques disclosed herein may be implemented via software and/or hardware as desired.

Although the embodiments above have been described in considerable detail, numerous variations and modifications will become apparent to those skilled in the art once the above disclosure is fully appreciated. It should also be emphasized that the above-described embodiments are only non-limiting examples of implementations. It is intended that the following claims be interpreted to embrace all such variations and modifications.

What is claimed is:

1. A system comprising:
a memory that stores a collection of video content items, wherein each of the video content items includes an encoded video stream and metadata that characterizes properties of a given source video stream corresponding to the encoded video stream;
a plurality of video transcoder devices; and
a controller, wherein, in response to each of a plurality of content requests for a given one of the video content items from a respective plurality of user devices, the controller is configured to assign an available one of the plurality of video transcoder devices to serve the respective user device, wherein the user devices have respectively different configurations of video processing capability (VPC), wherein each assigned video transcoder device is configured to:
receive the encoded video stream and metadata of the given video content item, wherein the metadata indicates:
rate estimation information for a plurality of encoding modes for a plurality of blocks of the encoded video stream, wherein the rate estimation information specifies an estimated number of bits generated by encoding ones of the blocks using ones of multiple different quantization step sizes and ones of the encoding modes; and
distortion estimation information that specifies multiple points on a distortion curve, wherein the points are generated based on discrete cosine transforms of ones of the plurality of blocks and processing of un-quantized coefficient outputs of the transform, wherein ones of the points indicate estimated distortion at a particular quantization step size;
compute aggregate rate estimation information and aggregate distortion estimation information by summing over the rate estimation information and distortion estimation, respectively, corresponding to different ones of the plurality of blocks;
select an encoding mode and quantization size for a transcoding of the encoded video stream based at least in part on the aggregate rate estimation information and the aggregate distortion estimation information and according to the VPC configuration of the respective user device;
transcode the encoded video stream using the selected encoding mode and quantization size, in order to obtain a respective target encoded video stream; and
transmit the respective target encoded video stream to the respective user device through a communication medium.

2. The system of claim 1, wherein the rate estimation information includes one or more rate information streams that each characterize a corresponding rate estimation function $R_k(q)$ per block of the corresponding encoded video stream, assuming block prediction based on the respective encoding mode, wherein q is a quantization step size.

3. The system of claim 1, wherein the metadata includes one or more candidate motion vectors per block of the encoded video stream of the given content item.

4. The system of claim 1, wherein the communication medium is a wireless transmission medium.

5. The system of claim 4, wherein at least one of the plurality of video transcoder devices is coupled to or incorporated as part of a base station of a wireless communication network, wherein one or more of the user devices are configured for wireless communication with the base station.

6. The system of claim 1, wherein the controller is configured to assign a first of the plurality of video transcoder devices to different ones of the user devices at different times.

7. The system of claim 1, further comprising:
a source encoder configured to encode source video streams to generate respective ones of the content items.

8. The system of claim 1, wherein the metadata of each video content item includes one or more distortion information streams corresponding to one or more respective coding modes, wherein each distortion information stream $DIS_k$ of the one or more distortion information streams characterizes a corresponding distortion function $D_k(q)$ per block of the encoded video stream of the video content item, assuming block prediction based on the respective coding mode, wherein q is a quantization step size.

9. The system of claim 1, wherein a first video transcoder device of the plurality of video transcoder devices is configured to perform said transcoding by:
  decoding the encoded video stream to obtain a decoded video stream;
  scaling the decoded video stream to a target picture resolution of the respective user device, in order to obtain a scaled video stream; and
  encoding the scaled video stream using the metadata and according to the VPC configuration of the respective user device, in order to obtain the respective target encoded video stream.

10. The system of claim 9, wherein the controller is configured to:
  receive reports from the user device being served by the first video transcoder device, wherein each of the reports includes analytical information from the user device; and
  in response to each of the reports, update a target bit rate and/or the target picture resolution used by the first video transcoder device to encode the scaled video stream.

11. The system of claim 10, wherein the analytical information includes information about quality of a link between the first video transcoder device and the user device.

12. The system of claim 11, wherein the controller is configured to decrease or increase the target bit rate and/or the target picture resolution used by the first video transcoder device when the information about link quality indicates that the link quality has decreased or increased, respectively.

13. The system of claim 10, wherein the analytical information includes information about quality of video recovered from the respective target encoded video stream transmitted by the first video transcoder device.

14. The system of claim 13, wherein the controller is configured to decrease or increase the target bit rate and/or the target picture resolution used by the first video transcoder device when the information about video quality indicates that the video quality has decreased or increased, respectively.

15. The system of claim 9, wherein the controller is configured to:
  receive reports from the user device being served by the first video transcoder device, wherein each of the reports includes a corresponding update to the VPC configuration of the user device; and
  in response to each of the reports, update the target picture resolution used by the first video transcoder device to encode the scaled video stream.

16. The system of claim 1, wherein the VPC configuration of each user device includes an identification of one or more of:
  a video coding format requested by the user device; and
  a target picture resolution requested by the user device.

17. The system of claim 1, wherein the VPC configurations of the respective user devices span an M-dimensional configuration space, wherein M is at least two, wherein the M-dimensional configuration space has at least a first dimension corresponding to a choice of video format and a second dimension corresponding to a selection of picture resolution.

18. The system of claim 1, wherein the controller is configured to:
  store the target encoded video stream generated by a given one of the plurality of video transcoder devices that has been assigned to serve a first of the user devices; and
  direct a transmission of the stored target encoded video stream to a second user device in response to detecting that the second user device has a same or similar VPC configuration as the first user device.

19. A method for delivering video content to user devices, the method comprising:
  storing a collection of video content items in a memory, wherein each of the video content items includes an encoded video stream and metadata that characterizes properties of a given source video stream corresponding to the encoded video stream, wherein the metadata indicates:
    rate estimation information for a plurality of encoding modes for a plurality of blocks of the encoded video stream, wherein the rate estimation information specifies an estimated number of bits generated by encoding using ones of multiple different quantization step sizes and ones of the encoding modes; and
    distortion estimation information that specifies multiple points on a distortion curve, wherein the points are generated based on discrete cosine transforms of ones of the plurality of blocks and processing of un-quantized coefficient outputs of the transform, wherein ones of the points indicate estimated distortion at a particular quantization step size;
  in response to each of a plurality of content requests for a given one of the video content items from a respective plurality of remote user devices, assigning an available one of a plurality of video transcoder devices to serve the respective user device, wherein the user devices have respectively different configurations of video processing capability (VPC); and
  utilizing each assigned video transcoder device to:
    receive the encoded video stream and metadata of the given video content item;
    compute aggregate rate estimation information and aggregate distortion estimation information by summing over the rate estimation information and distortion estimation, respectively, corresponding to different ones of the plurality of blocks;
    select an encoding mode and quantization size for a transcoding of the encoded video stream based at least in part on the aggregate rate estimation information and the aggregate distortion estimation information and according to the VPC configuration of the respective user device;
    transcode the encoded video stream using the selected encoding mode and quantization size in order to obtain a respective target encoded video stream; and
    transmit the respective target encoded video stream to the respective user device through a communication medium.

20. The method of claim 19, wherein the rate estimation information includes one or more rate information streams that each characterize a corresponding rate estimation function $R_k(q)$ per block of the corresponding encoded video stream, assuming block prediction based on the respective encoding mode, wherein q is a quantization step size.

21. The method of claim 20, wherein the metadata includes one or more candidate motion vectors per block of the encoded video stream of the given video content item.

22. The method of claim 19, wherein the metadata of each video content item includes one or more distortion information streams corresponding to one or more respective coding modes, wherein each distortion information stream $DIS_k$ of the one or more distortion information streams characterizes a corresponding distortion function $D_k(q)$ per block of the encoded video stream of the given video content item, assuming block prediction based on the respective coding mode, wherein q is a quantization step size.

23. The method of claim 19, further comprising:
encoding source video streams to generate respective ones of the content items.

24. The method of claim 19, further comprising:
receiving reports from the user device being served by a first of the plurality of video transcoder devices, wherein each of the reports includes analytical information from the user device; and
in response to each of the reports, update a target bit rate and/or a target picture resolution used by the first video transcoder device to perform said transcoding of the encoded video stream.

25. The method of claim 24, wherein the analytical information includes information about quality of a link between the first video transcoder device and the user device.

26. The method of claim 25, further comprising:
decreasing or increasing the target bit rate and/or the target picture resolution used by the first video transcoder device when the information about link quality indicates that the link quality has decreased or increased, respectively.

27. The method of claim 24, wherein the analytical information includes information about the quality of video recovered from the respective target encoded video stream transmitted by the first video transcoder device.

28. The method of claim 27, further comprising:
decreasing or increasing the target bit rate and/or the target picture resolution used by the first video transcoder device when the information about video quality indicates that the video quality has decreased or increased, respectively.

29. The method of claim 19, further comprising:
receiving reports from the user device being served by the first video transcoder device, wherein each of the reports includes a corresponding update to the VPC configuration of the user device; and
in response to each of the reports, updating the target picture resolution used by the first video transcoder device to encode the video stream.

30. The method of claim 19, wherein the VPC configuration of each user device includes an identification of a video coding format requested by the user device, wherein said transcoding of the encoded video stream is performed so that the respective target encoded video stream conforms to the requested video coding format.

31. The method of claim 19, wherein the VPC configuration of each user device includes an identification of a target picture resolution requested by the user device, wherein said transcoding of the encoded video stream is performed so that the respective target encoded video stream has the requested target picture resolution.

32. The method of claim 19, wherein the VPC configuration of each user device includes an identification of a target bit rate requested by the user device, wherein said transcoding of the encoded video stream is performed so that the respective target encoded video stream has an average output bit rate approximately equal to the requested target bit rate.

33. The method of claim 19, further comprising:
storing the target encoded video stream generated by a given one of the plurality of video transcoder devices that has been assigned to serve a first of the user devices; and
directing a transmission of the stored target encoded video stream to a second user device in response to detecting that the second user device has a same or similar VPC configuration as the first user device.

34. A video encoder comprising:
digital circuitry configured to perform, for each of a plurality of blocks of the input video stream, operations including:
transforming a plurality of prediction residuals that correspond respectively to a plurality of coding modes in order to obtain a plurality of respective transform blocks for the plurality of respective encoding modes;
for each coding mode $M_k$, processing the respective prediction residual and/or the respective transform block for the coding mode $M_k$ to obtain rate modeling data and distortion modeling data for the coding mode $M_k$, wherein the distortion modeling data specifies multiple points on a distortion curve, wherein the points are generated based on discrete cosine transforms of ones of the plurality of blocks and processing of un-quantized coefficient outputs of the transform, wherein ones of the points indicate estimated distortion at a particular quantization step size,
wherein the digital circuitry is further configured to generate an encoded video stream that represents an encoded version of the input video stream;
transmission circuitry configured to transmit metadata and the encoded video stream onto a communication medium, wherein the metadata characterizes properties of a corresponding given source video stream and includes the rate modeling data for each coding mode and for each block that specifies an estimated number of bits generated by encoding using one or more quantization step sizes and wherein the metadata further includes the distortion modeling data.

35. The video encoder of claim 34, wherein the rate modeling data includes data characterizing a rate estimation function $R_k(q)$ for at least one of the one or more coding modes, wherein q represents quantization step size.

36. The video encoder of claim 34, wherein the operations also include:
for each coding mode $M_k$, generating one or more reconstruction residuals based respectively on one or more quantized versions of the transform block for that coding mode, and generating distortion modeling data for the coding mode based on the one or more reconstruction residuals, wherein the metadata also includes the distortion modeling data for each coding mode and each block.

37. The video encoder of claim 36, wherein the distortion modeling data includes data characterizing a distortion estimation function $D_k(q)$ for at least one of the one or more coding modes, wherein q represents quantization step size.

38. The video encoder of claim 34, wherein generating the encoded video stream includes operating on at least one of the one or more transform blocks.

39. A video encoder comprising:
digital circuitry configured to encode an input video stream to obtain an encoded video stream, wherein said encoding includes generating metadata that characterizes properties of the input video stream, wherein the metadata indicates:
rate estimation information for a plurality of encoding modes for a plurality of blocks of the encoded video stream, wherein the rate estimation information specifies an estimated number of bits generated by encoding using ones of multiple different quantization step sizes and ones of the encoding modes; and
distortion estimation information that specifies multiple points on a distortion curve, wherein the points are generated based on discrete cosine transforms of ones of the plurality of blocks and processing of un-quantized coefficient outputs of the transform, wherein ones of the points indicate estimated distortion at a particular quantization step size;
transmission circuitry configured to transmit the encoded video stream and the metadata.

40. The video encoder of claim 39, wherein the metadata includes a stream of candidate motion vectors.

41. A video transcoding system comprising:
a decoder configured to receive and decode a first encoded video stream to obtain a decoded video stream;
a scaling processing element configured to scale the decoded video stream to a target picture resolution in order to obtain a scaled video stream;
an output encoder configured to receive metadata that characterizes properties of a source video stream corresponding to the first encoded video stream, wherein the metadata indicates:
rate estimation information for a plurality of encoding modes for a plurality of blocks of the encoded video stream, wherein the rate estimation information specifies an estimated number of bits generated by encoding ones of the blocks using ones of multiple different quantization step sizes and ones of the encoding modes; and
distortion estimation information that specifies multiple points on a distortion curve, wherein the points are generated based on discrete cosine transforms of ones of the plurality of blocks and processing of un-quantized coefficient outputs of the transform, wherein ones of the points indicate estimated distortion at a particular quantization step size;
wherein the output encoder is further configured to:
compute aggregate rate estimation information and aggregate distortion estimation information by summing over the rate estimation information and distortion estimation, respectively, corresponding to different ones of the plurality of blocks;
select an encoding mode and quantization size for a transcoding of the encoded video stream based at least in part on the aggregate rate estimation information and the aggregate distortion estimation information and according to the VPC configuration of the respective user device; and
encode the scaled video stream using the selected encoding mode in order to obtain a second encoded video stream.

42. The video transcoding system of claim 41, wherein the first encoded video stream is an encoded version of a source video stream.

43. The video transcoding system of claim 41, wherein the target picture resolution is lower than a picture resolution implicit in the first encoded video stream.

44. The video transcoding system of claim 41, wherein the metadata includes N rate information streams corresponding to N respective coding modes, wherein N is greater than or equal to one, wherein each rate information stream $RIS_k$ of the N rate information streams characterizes a corresponding rate estimation function $R_k(q)$ per block of the first encoded video stream assuming block prediction based on the respective coding mode, wherein q is a quantization step size.

45. The video transcoding system of claim 44, wherein N=2 for a given coded picture of the first encoded video stream, wherein the rate information stream $RIS_1$ corresponds to an intra coding mode, wherein the rate information stream $RIS_2$ corresponds to an inter coding mode.

46. The video transcoding system of claim 44, wherein each rate information stream $RIS_k$ characterizes the rate estimation function $R_k(q)$ for each block with a corresponding set of one or more fitting parameters associated with a continuous functional model.

47. The video transcoding system of claim 41, wherein the metadata includes N distortion information streams corresponding to N respective coding modes, wherein N is greater than or equal to one, wherein each distortion information stream $DIS_k$ of the N distortion information streams characterizes a corresponding distortion estimation function $D_k(q)$ per block of the first encoded video stream assuming block prediction based on the respective coding mode, wherein q is a quantization step size.

48. The video transcoding system of claim 47, wherein N=2 for a given coded picture of the first encoded video stream, wherein the distortion information stream $DIS_1$ corresponds to an intra coding mode, wherein the distortion information stream $DIS_2$ corresponds to an inter coding mode.

49. The video transcoding system of claim 47, wherein each distortion information stream $DIS_k$ characterizes the distortion estimation function $D_k(q)$ for each block with a corresponding set of one or more fitting parameters associated with a continuous functional model.

50. The video encoder of claim 41, wherein the output encoder is configured to process the metadata in order to obtain an aggregate rate estimation function $RA(q)$ for each frame of the scaled video stream, wherein q represents quantization step size.

51. The video encoder of claim 50, wherein the output encoder is configured to further process the metadata in order to obtain an aggregate distortion estimation function $DA(q)$ for each frame of the scaled video stream.

52. The video transcoding system of claim 41, wherein the metadata includes one or more candidate motion vectors for each block of the first encoded video stream, wherein the output encoder is configured to perform a fine-resolution motion vector refinement for each block that is restricted to one or more neighborhoods in motion vector space based on the one or more candidate motion vectors.

53. The video transcoding system of claim 41, wherein said decoder is configured to recover a motion vector for each block from the first encoded video stream as part of said decoding the first encoded video stream, wherein the output encoder is configured to perform a motion vector refinement for each block that is restricted to a neighborhood in motion vector space based on the motion vector for the block.

54. The video transcoding system of claim 41, wherein the metadata includes one or more candidate motion vectors per block, wherein said encoding the scaled video stream includes selecting a motion vector from a set of vectors including the one or more candidate motion vectors.

55. The video transcoding system of claim 54, wherein the set of vectors also include a decoded motion vector recovered from the first encoded video stream.

56. The video transcoding system of claim 41, further comprising:
   transmission circuitry configured to transmit the second encoded video stream to a remote decoder through a communication medium.

57. The video transcoding system of claim 41, wherein the output encoder is configured to receive auxiliary information and inject the auxiliary information into the scaled video stream, wherein the auxiliary information includes one or more of:
   branding information of a business entity;
   advertising information;
   digital rights management (DRM) information;
   digital information providing watermark functionality;
   customized features requested by a content provider, content delivery service provider, customer or user.

58. The video transcoding system of claim 41, wherein at least one of the decoder, the scaling processing element, and the output encoder is implemented using software configured for execution on an array of parallel processors.

59. The video transcoding system of claim 41, wherein the decoder, the scaling processing element, and the output encoder are implemented on distinct subsets of processors in an array of parallel processors.

\* \* \* \* \*